(12) United States Patent  
Koyama et al.

(10) Patent No.: US 8,851,557 B2
(45) Date of Patent: Oct. 7, 2014

(54) SADDLE-RIDE TYPE VEHICLE

(71) Applicant: Honda Motor Co., Ltd., Tokyo (JP)

(72) Inventors: Yoshinori Koyama, Wako (JP); Kenji Kawai, Wako (JP); Yoshihiro Takanashi, Wako (JP); Takashi Watanabe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/899,664

(22) Filed: May 22, 2013

(65) Prior Publication Data

US 2013/0313861 A1 Nov. 28, 2013

(30) Foreign Application Priority Data

May 28, 2012 (JP) .................. 2012-120894

(51) Int. Cl.
- B62D 25/16 (2006.01)
- B62K 11/02 (2006.01)
- B62J 15/02 (2006.01)
- B62J 15/00 (2006.01)

(52) U.S. Cl.
CPC ................. B62K 11/02 (2013.01); B62J 15/02 (2013.01); B62J 15/00 (2013.01)
USPC ...................................... 296/198

(58) Field of Classification Search
USPC ......... 296/198; 280/847, 152.1, 152.2, 152.3, 280/848
See application file for complete search history.

(56) References Cited

U.S. PATENT DOCUMENTS

| 8,016,308 | B2 * | 9/2011 | Ishikawa et al. ........... 280/152.1 |
| 8,167,467 | B2 * | 5/2012 | Iida et al. ...................... 362/473 |
| 8,459,393 | B2 * | 6/2013 | Yamamoto .................... 180/219 |
| 2008/0023991 | A1 * | 1/2008 | Hlopick et al. ............... 296/198 |
| 2010/0194149 | A1 * | 8/2010 | Yamamoto .................... 296/198 |
| 2012/0248734 | A1 * | 10/2012 | Matsushima et al. ...... 280/281.1 |

FOREIGN PATENT DOCUMENTS

| JP | S57-58573 | U | 4/1982 |
| JP | S59-170091 | U | 11/1984 |
| JP | H05-319337 | A | 12/1993 |
| JP | H06-298145 | A | 10/1994 |
| JP | 2011-213225 | A | 10/2011 |
| WO | 2011/104748 | A1 | 9/2011 |

* cited by examiner

Primary Examiner — Lori Lyjak
(74) Attorney, Agent, or Firm — Squire Patton Boggs (US) LLP

(57) ABSTRACT

A rear fender of a vehicle can include a front-side rear fender forming a front part and a rear-side rear fender attached to a rear portion of the front-side rear fender. The rear-side rear fender can include an outer fender configured to be visually recognized as exterior when viewed from the rear of the vehicle, an inner fender provided inside the outer fender, and a metal rear stay provided between the outer fender and the inner fender. The rear stay is detachably attached to a vehicle body frame.

14 Claims, 19 Drawing Sheets (A)

(B)

(A)

(B)

(A)

(B)

SADDLE-RIDE TYPE VEHICLE

BACKGROUND

1. Field

The present invention relates to a saddle-ride type vehicle including a rear fender covering a rear wheel from above.

2. Description of the Related Art

Saddle-ride type vehicles have been known in which saddle bags are attached to rear frames, left and right saddle bag covers cover the rear surfaces of the saddle bags, a rear fender is detachably attached to the saddle bag covers, and a license light for illuminating the license plate is attached to the rear fender (see Patent Document 1 (Japanese Patent Application Publication No. 2011-213225), for example).

SUMMARY

In the case where the distance from the rear frames to the license light is short, the above structure has no problem in supporting the rear fender, the license light, and the like. However, in the case where the distance from the rear frames to the license light is long, the structure needs reinforcement with stays. Here, if the stays are exposed to the outside, exterior appearance and configuration can be problematic, and cannot be easily customized.

Moreover, saddle-ride type vehicles that can be customized to riders' preferences have been desired.

The present invention has been made in view of the above circumstances, and an object thereof is to provide a saddle-ride type vehicle which can secure strength for supporting a rear fender, a license light, and the like and improve exterior at the same time and which can be customized easily.

For the purpose of solving the above-mentioned problems, embodiments of the invention provide a saddle-ride type vehicle including a rear fender attached above a rear wheel to a vehicle body frame. The rear fender can include a front-side rear fender forming a front part, and a rear-side rear fender attached to a rear portion of the front-side rear fender. The rear-side rear fender can include an outer fender designed to be visually recognized as exterior when viewed from a rear of the vehicle, an inner fender provided inside the outer fender, and a metal stay provided between the outer fender and the inner fender. The stay can be detachably attached to the vehicle body frame. According to this configuration, the stay is housed inside the rear-side rear fender. Thus, the strength for supporting the rear fender can be increased. Moreover, the stay is not exposed to the outside. Furthermore, since the rear-side rear fender is freely attachable and detachable, the rear-side rear fender can be easily removed. Thus, the rear-side rear fender can be easily replaced when broken, and the motorcycle can also be easily customized to the rider's preference.

In the above configuration, the front-side rear fender may be sandwiched between the stay and the vehicle body frame and be fastened to a vehicle body frame side together with the stay. According to this configuration, the front-side rear fender and the stay can be fixed firmly by the fastening.

Additionally, in the above configuration, a rear portion of the front-side rear fender and a front portion of the outer fender may be overlapped with each other on a lower portion of the vehicle body frame, and the outer fender may be sandwiched between the stay and the front-side rear fender and be fastened to the vehicle body frame side together with the stay and the front-side rear fender. According to this configuration, the front-side rear fender, the outer fender, and the stay can be fixed firmly by the fastening.

In addition, in the above configuration, the vehicle body frame may include a bracket extending toward the rear of the vehicle and a bracket extending toward an inside of the vehicle, and the stay may be attached to the brackets. According to this configuration, the stay can be fastened easily since the brackets extend toward the rear of the vehicle and the inside of the vehicle.

Moreover, in the above configuration, a rear end of the inner fender may be located closer to a front of the vehicle than a rear end of the outer fender. According to this configuration, the inner fender is not provided to extend to the rear end of the vehicle body. This prevents unnecessary weight increase and also offers compactness.

Additionally, in the above configuration, the stay may be a license-light stay. According to this configuration, the strength for supporting the license light can be increased.

In addition, the vehicle body frame may include a pair of left and right seat frames supporting a seat and a pair of left and right sub frames extending upwardly rearward below the seat frames, and the rear-side rear fender may be detachably attached to a joining member joining rear end portions of the seat frames and the sub frames to each other. According to this configuration, the rear-side rear fender can be supported by a portion with high rigidity.

According to certain embodiments of the present invention, the rear fender includes the front-side rear fender forming a front part and the rear-side rear fender attached to a rear portion of the front-side rear fender. The rear-side rear fender includes the outer fender designed to be visually recognized as exterior when viewed from the rear of the vehicle, the inner fender provided inside the outer fender, and the metal stay provided between the outer fender and the inner fender. The stay is detachably attached to the vehicle body frame. Hence, the stay is housed inside the rear-side rear fender. Thus, the strength for supporting the rear fender can be increased. Moreover, the stay is not exposed to the outside. Furthermore, since the rear-side rear fender is freely attachable and detachable, the rear-side rear fender can be easily removed. Thus, the rear-side rear fender can be easily replaced when broken, and the motorcycle can also be easily customized to the rider's preference.

The front-side rear fender is sandwiched between the stay and the vehicle body frame and fastened to the vehicle body frame side together with the stay. By this fastening, the front-side rear fender and the stay can be fixed firmly.

A rear portion of the front-side rear fender and a front side of the outer fender are overlapped with each other on a lower portion of the vehicle body frame, and the outer fender is sandwiched between the stay and the front-side rear fender and fastened to the vehicle body frame side together with the stay and the front-side rear fender. By this fastening, the front-side rear fender, the outer fender, and the stay can be fixed firmly.

The vehicle body frame includes the bracket extending toward the inside of the vehicle and the bracket extending toward the rear of the vehicle, and the stay is attached to the brackets. The stay can be fastened easily since the brackets extend toward the rear of the vehicle and the inside of the vehicle.

The rear end of the inner fender is located closer to the front of the vehicle than the rear end of the outer fender is. This prevents unnecessary weight increase and also offers compactness.

The stay is a license-light stay. Accordingly, the strength for supporting the license light can be increased.

The vehicle body frame includes the pair of left and right seat frames supporting the seat and the pair of left and right sub frames extending upwardly rearward below the seat frames, and the rear-side rear fender is detachably attached to the joining member joining rear end portions of the seat frames and the sub frames to each other. Accordingly, the rear-side rear fender can be firmly supported by a portion with high rigidity.

DETAILED DESCRIPTION

Figure 1:
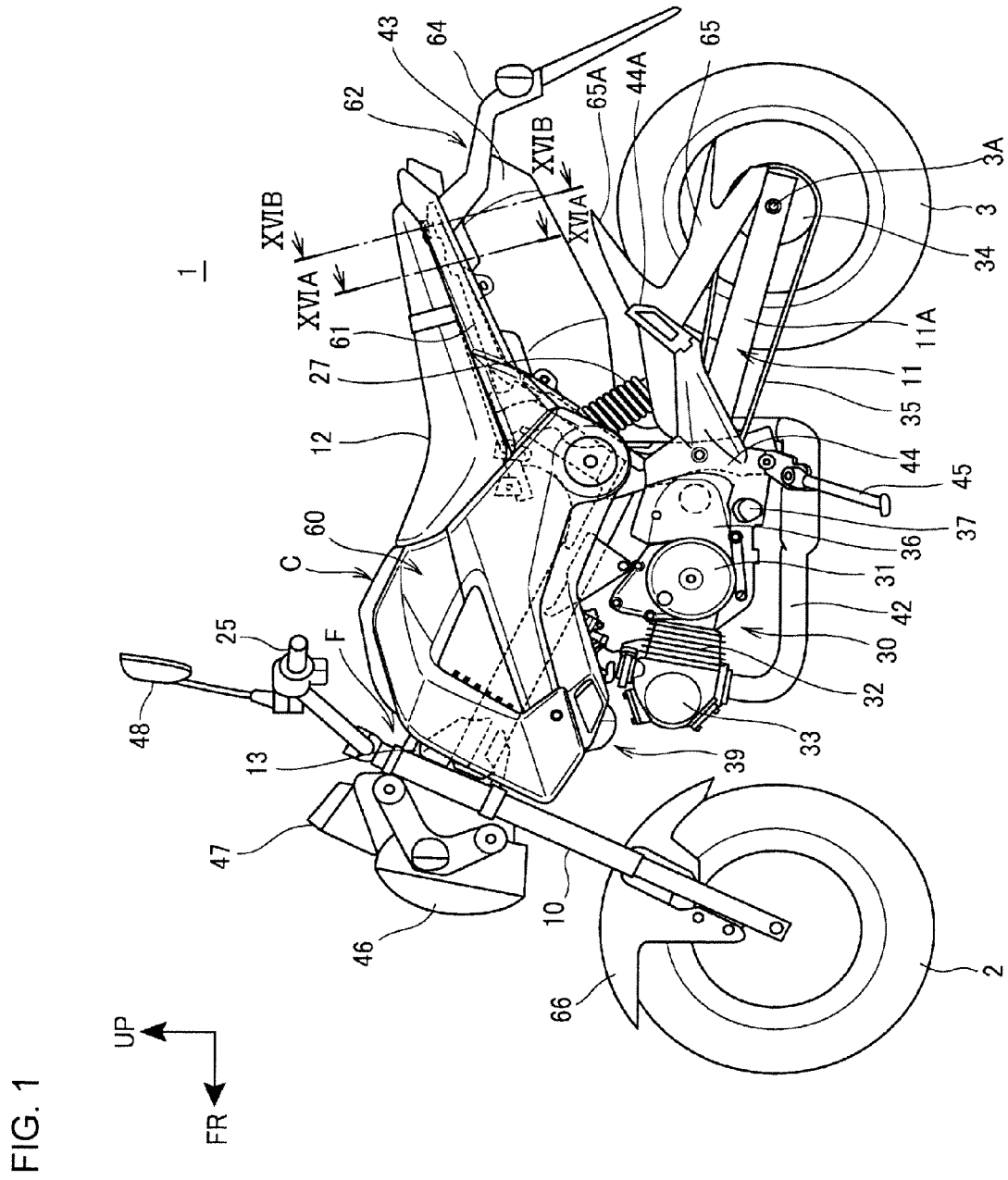
FIG. 1 is a left-side view of a motorcycle according to an embodiment of the present invention.

Hereinbelow, an embodiment of the present invention will be described with reference to the drawings. Note that directions such as front, rear, left, right, upper, and lower in the following description are identical to the directions based on the vehicle body, unless otherwise noted. Moreover, reference numerals FR, UP, and LE shown in drawings represent the front, upper, and left sides of the vehicle body, respectively.

FIG. 1 is a left-side view of a motorcycle according to the embodiment of the present invention.

A motorcycle 1 is, in this embodiment, a saddle-ride type vehicle in which an engine 30 is arranged at the center of a vehicle body frame F in the front-rear direction. A front fork 10 that supports a front wheel 2 is steerably supported on the front end of the vehicle body frame F. A swingarm 11 that supports a rear wheel 3 is provided on a rear side of the vehicle body frame F. A seat 12 for an occupant to sit is provided above the vehicle body frame F. The vehicle body frame F is mostly covered with a resin vehicle body cover C.

Figure 2:
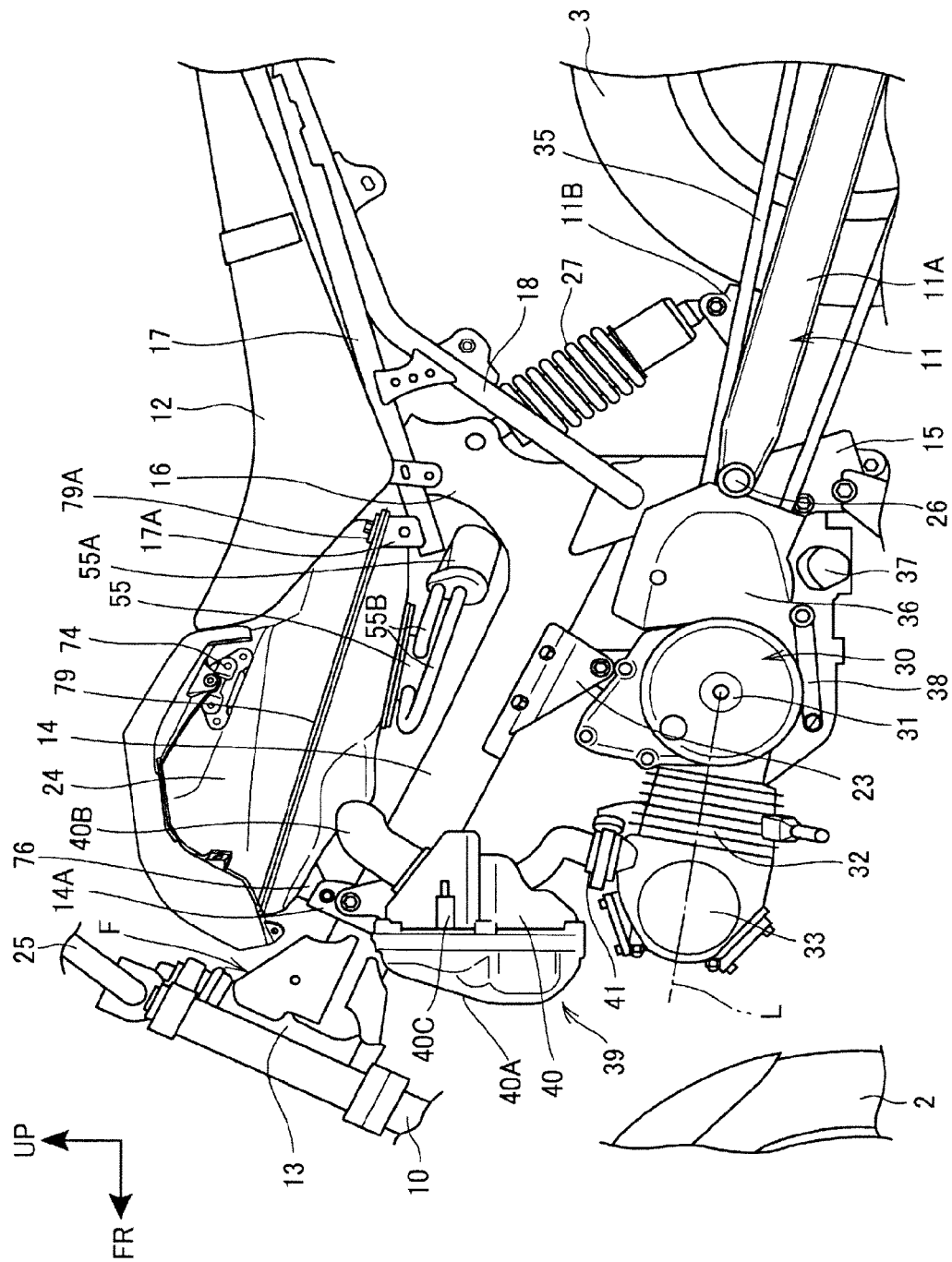
FIG. 2 is a left-side view of a main part of the motorcycle with most parts of a vehicle body cover being removed.
Figure 3:
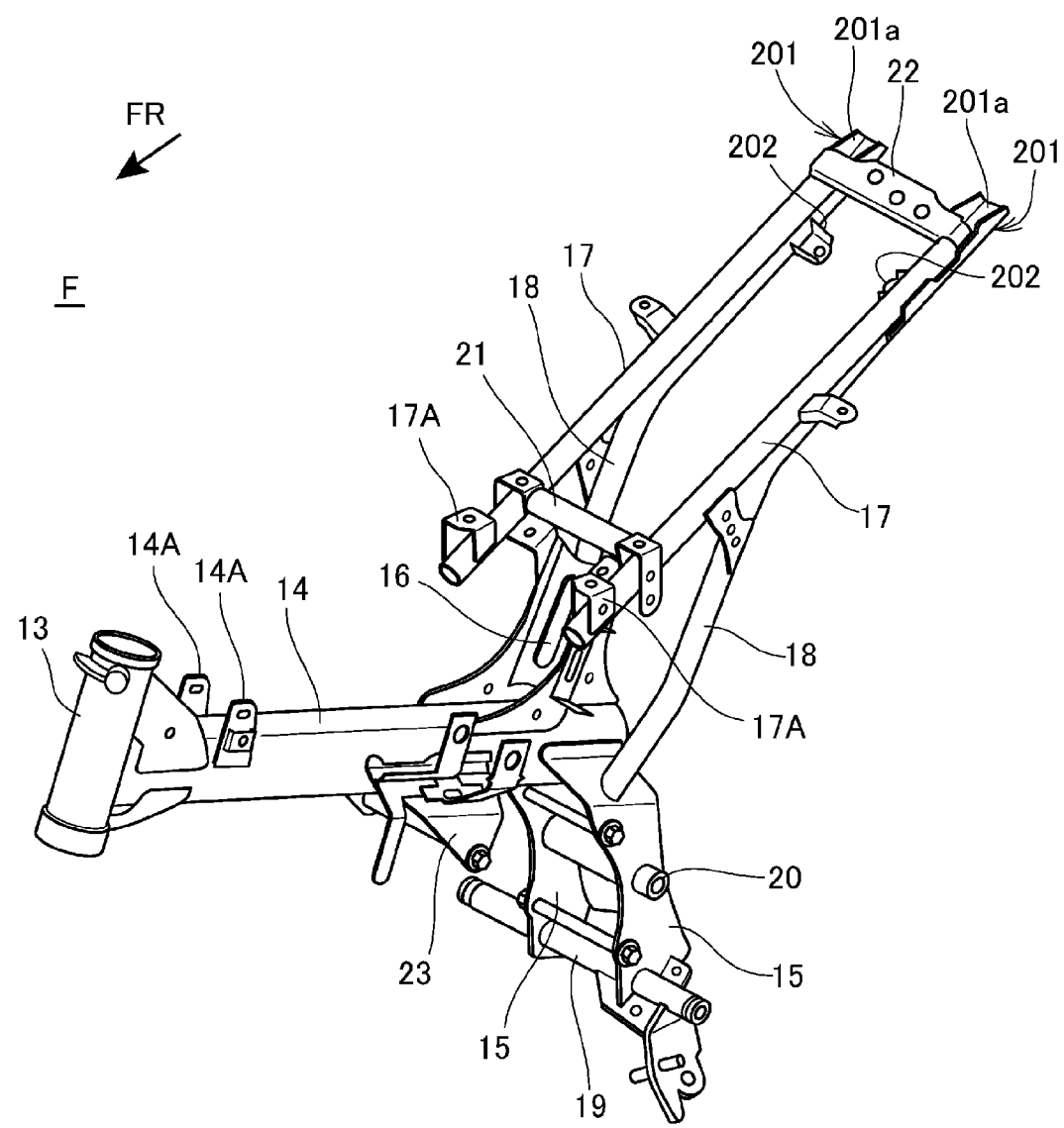
FIG. 3 is a perspective view of a vehicle body frame.

FIG. 2 is a left-side view of a main part of the motorcycle 1 with most parts of the vehicle body cover C being removed.
FIG. 3 is a perspective view of the vehicle body frame F.

As shown in FIG. 3, the vehicle body frame F includes a head pipe 13 provided at the front end; a single main frame 14 extending rearward from the head pipe 13 while inclining downward. A pair of left and right center frames 15 and 15 extend outward in the vehicle width direction respectively from the left and right surfaces of a rear portion of the main frame 14 and then extend downward. A suspension bracket 16 extends upwardly rearward from the upper surface of the rear portion of the main frame 14 toward the seat 12 (see FIG. 1). A pair of left and right seat frames 17 and 17 extend upwardly rearward from an upper end portion of the suspension bracket 16 to a rear part of the vehicle. A pair of left and right sub frames 18 and 18 extend upwardly rearward behind the suspension bracket 16 and respectively joining upper portions of the center frames 15 and 15 and middle portions, in the front-rear direction, of the seat frames 17 and 17.

A lower cross pipe 19 joining the left and right center frames 15 and 15 is provided at lower portions of the center frames 15 and 15. A cross pipe 20 joining the left and right center frames 15 and 15 is provided at middle portions, in the top-bottom direction, of the center frames 15 and 15.

A front cross member 21 and a rear cross member joining the left and right seat frames 17 and 17 are provided at front and rear portions of the seat frames 17 and 17. Moreover, a pair of left and right rear tank stays 17A and 17A to which a fuel tank 24 (see FIG. 2) is fixed are provided at the front ends of the seat frames 17 and 17, respectively.

An engine hanger 23 to which the engine 30 (see FIG. 1) is fixed is provided on the lower surface of a middle portion, in the front-rear direction, of the main frame 14. A pair of left and right front tank stays 14A and 14A to which the fuel tank 24 is fixed are provided on the upper surface of a front portion of the main frame 14.

As shown in FIG. 2, the fuel tank 24 is provided above the main frame 14 and extends from the rear of the head pipe 13 to the front of the seat frames 17 and 17. The seat 12 is provided continuously over a rear portion of the fuel tank 24 and extends along the upper surfaces of the seat frames 17 and 17 to the rear part of the vehicle.

The front fork 10 is turnably supported on the head pipe 13 through a steering shaft (not shown). As shown in FIG. 1, the front wheel 2 is rotatably supported on a lower portion of the front fork 10. A steering handlebar 25 is fixed to the upper end of the front fork 10.

As shown in FIGS. 1 and 2, the swingarm 11 includes a pair of left and right arm portions 11A (the right arm portion is not shown) extending rearward from the outer side surfaces of the center frames 15 and 15, respectively. A cross member (not shown) connects the left and right arm portions 11A and 11A at a front portion of the swingarm 11. The rear wheel 3 is rotatably supported by an axle 3A laid between the arm portions 11A and 11A at a rear portion of the swingarm 11. The swingarm 11 is joined to the center frames 15 and 15 through a pivot shaft 26 inserted through the front ends of the arm portions 11A and 11A and is vertically swingable about the pivot shaft 26. The pivot shaft 26 is inserted in the cross pipe 20 (see FIG. 3).

The lower end of a cylindrical rear cushion unit 27 is joined to a lower bracket 11B provided on the above-mentioned cross member of the swingarm 11, while the upper end of the rear cushion unit 27 is joined to the suspension bracket 16 of the vehicle body frame F.

In this example, the engine 30 is an air-cooled single-cylinder four-stroke engine and is a horizontal engine inclined forward to a large extent such that its cylinder's axis L (see FIG. 2) is almost horizontal. The engine 30 is formed of a crankcase 31, a cylinder 32, and a cylinder head 33 in this order from the rear, the crankcase 31 incorporating a crankshaft (not shown) and a transmission (not shown). Since the engine 30 is a horizontal engine, the center of gravity of the vehicle body can be set low. An output shaft (not shown) of the engine 30 projects from the left surface of a rear portion of the crankcase 31. The rear wheel 3 is driven by a drive chain 35 laid between a drive sprocket (not shown) of the output shaft and a driven sprocket 34 of the rear wheel 3. The drive sprocket of the output shaft is covered with a sprocket cover 36.

A pair of left and right steps 37 and 37 (the right step is not shown) for the rider sitting on the seat 12 to place his or her feet are provided on left and right lower surfaces of the rear portion of the crankcase 31, respectively. A shift pedal 38 used for gearshift operations of the transmission is provided in front of the left step 37.

The engine 30 is supported on the vehicle body frame F by fixing a front upper portion of the crankcase 31 to the engine hanger 23 and also by fixing the rear portion of the crankcase 31 to the center frames 15 and 15.

In the motorcycle 1, the engine 30, which is a horizontal engine, is supported in such a way as to be hung on the main frame 14 which extends downwardly rearward, thereby securing a space between a front portion of the main frame 14 and the engine 30. In this space, an intake unit 39 is arranged. The intake unit 39 includes an air cleaner box 40 which cleans intake air, and a throttle body 41 which is connected to an intake port in the upper surface of the engine 30 and which supplies air from the air cleaner box 40 to the engine 30. The throttle body 41 is provided with an injector (not shown) which injects fuel supplied from the fuel tank 24 into an intake passage.

The air cleaner box 40 is formed in a large box shape extending vertically inside the space between the lower surface of the front portion of the main frame 14 and the upper surface of the cylinder head 33 to such an extent as to almost completely fill the space. The air cleaner box 40 is splittable into two, front and rear parts. By removing a front lid part 40A, maintenance of a filter (not shown) inside can be performed easily. Moreover, an intake duct 40B through which to take air into the air cleaner box 40 extends upwardly rearward on a left side of the main frame 14 from a rear left portion of the air cleaner box 40 and is opened toward the rear below the fuel tank 24. Engaging portions 40C projecting rearward are formed on end portions, in the vehicle width direction, of the air cleaner box 40 and are engaged with a tank cover 60 to be described later.

The throttle body 41 is arranged behind the air cleaner box 40 between the cylinder head 33 and the main frame 14 and is connected to an intake port in the upper surface of the cylinder head 33.

An exhaust pipe 42 is connected to an exhaust port in the lower surface of the cylinder head 33. The exhaust pipe 42 extends downward from the exhaust port, bends and extends rearward, bends upward behind the center frames 15, and connects to a muffler 43 fixed to the right seat frame 17.

Plate-shaped step stays 44 are provided on the side surfaces of the center frames 15 and 15 in such a way as to cover the front end of the swingarm 11 from the lateral sides, respectively. Tandem steps 44A for the passenger to place his or her feet are provided at the rear ends of the step stays 44, respectively.

A side stand 45 is attached to the lower end of the left center frame 15.

A headlight unit 46 and a meter unit 47 are attached to a front portion of the head pipe 13 through stays (not shown). Side mirrors 48 are provided on the handlebar 25.

The vehicle body cover C includes the tank cover 60 covering the fuel tank 24, the main frame 14, and the air cleaner box 40. A pair of left and right rear side covers 61 and 61 (the right rear side cover is not shown) cover the left and right seat frames 17 and 17 from the lateral sides, respectively. A rear fender 62 is provided above the rear wheel 3. The rear fender 62 includes a front-side rear fender 63 (see FIG. 6) covering the seat frames 17 and 17 from below, and a rear-side rear fender 64 to which the license plate and the like are attached. A chain cover 65 covering the drive chain 35 from above is attached to the swingarm 11. A mudguard part 65A covering the rear wheel 3 from above is formed on the chain cover 65.

A front fender 66 covering the front wheel 2 from above is attached to the front fork 10.

As shown in FIG. 2, the fuel tank 24 is a box-shaped tank incorporating a fuel pump 55 which supplies the fuel into the engine 30. A front portion of the fuel tank 24 is fixed to the main frame 14 through the front tank stays 14A. A rear portion of the fuel tank 24 is fixed to the seat frames 17 and 17 above the suspension bracket 16 through a rear-portion fixing portion 79A in such a way as to be away from the upper surface of the main frame 14. Thus, there is a space formed between the rear portion of the fuel tank 24 and the upper surface of the main frame 14. In this space, a fuel filter 55A of the fuel pump is arranged. The fuel filter 55A is formed in a cylindrical shape and connected to a lower portion of the fuel pump by a pair of fuel hoses 55B and 55B.

Figure 4:
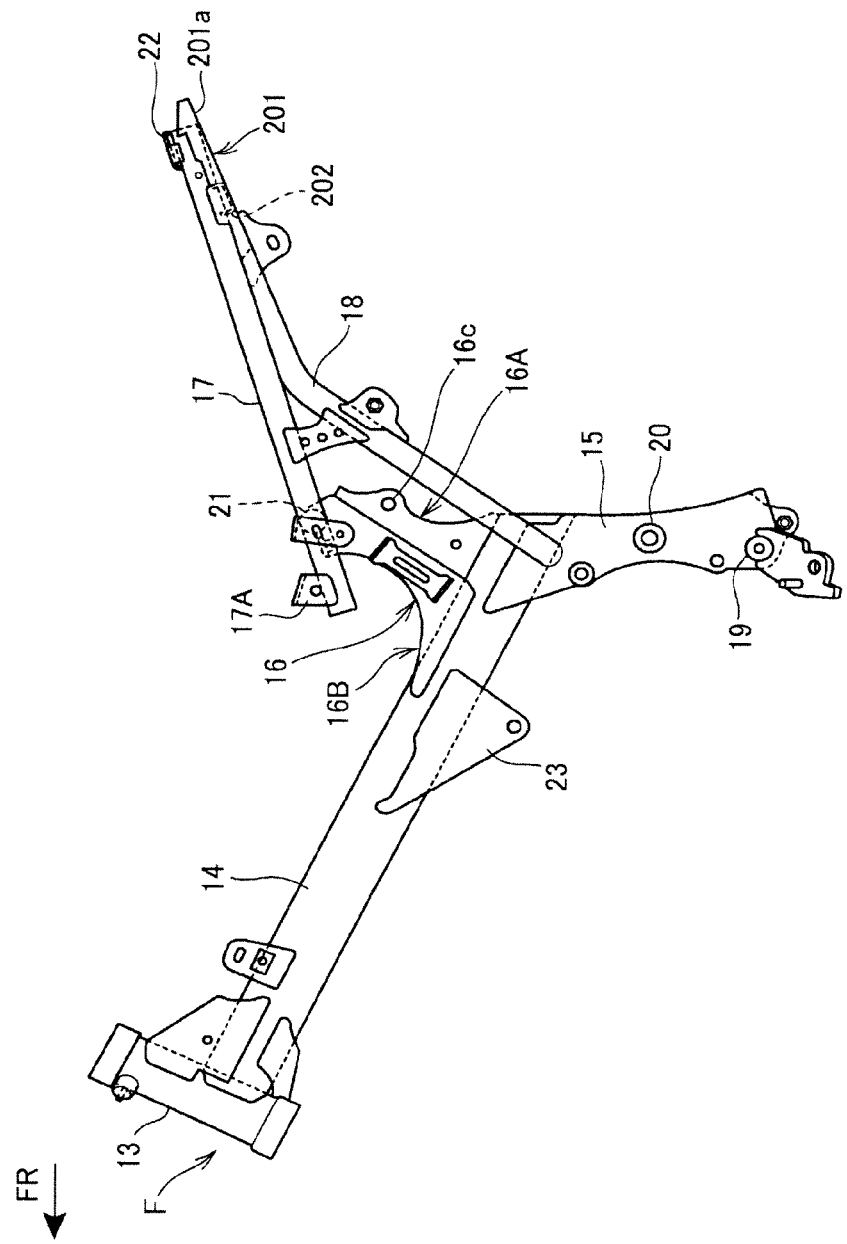
FIG. 4 is a side view showing the vehicle body frame.
Figure 5:
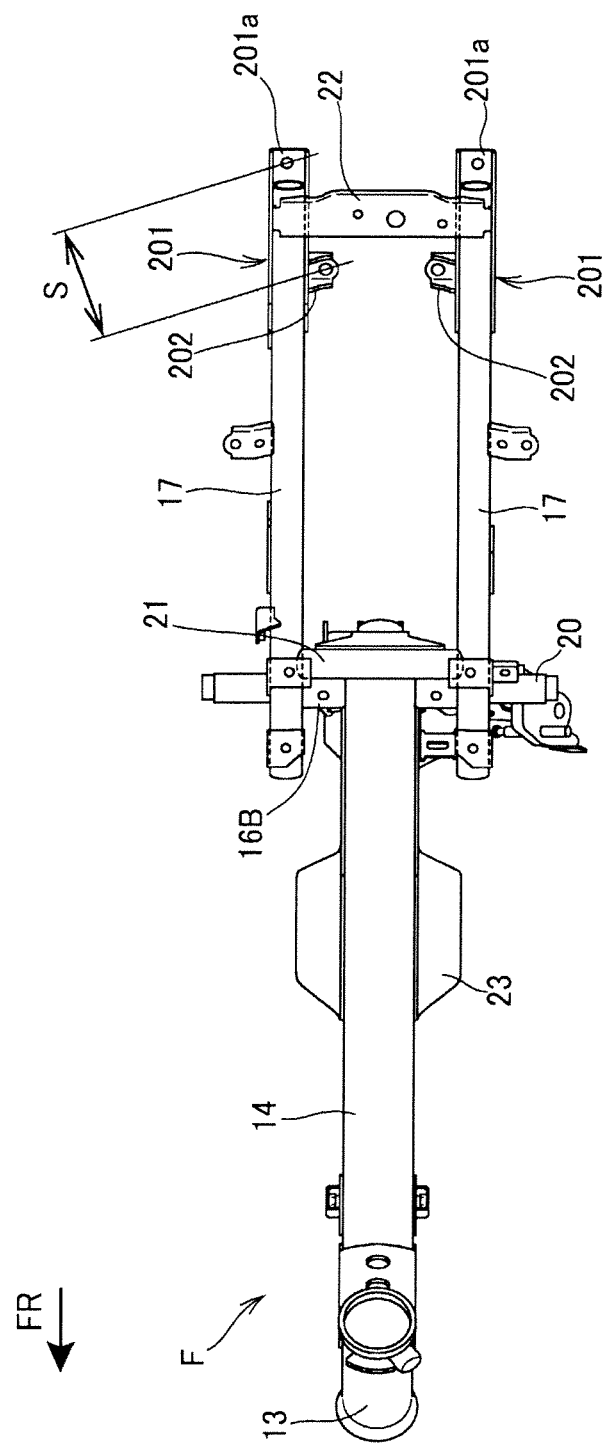
FIG. 5 is a plan view showing the vehicle body frame.

FIG. 4 is a side view showing the vehicle body frame F.
FIG. 5 is a plan view showing the vehicle body frame F.

As shown in FIGS. 4 and 5, the suspension bracket 16 constituting the vehicle body frame F includes a bracket body 16A in which a pair of left and right attachment holes 16c and 16c (the right attachment hole is not shown) to attach the upper end of the rear cushion unit 27 (see FIG. 2) are formed, and a reinforcing member 16B attached to a front portion of the bracket body 16A and the main frame 14 for the purpose of reinforcing the bracket body 16A. An upper end portion of the reinforcing member 16B is joined to the left and right seat frames 17 and 17 and the front cross member 21.

The rear ends of the sub frames 18 and 18 are located closer to the front of the vehicle body than are the rear ends of the seat frames 17 and 17. The rear ends of the sub frames 18 and 18 are arranged under the seat frames 17 and 17, respectively. Rear end joining members 201 and 201 extending in the front-rear direction are attached to rear end portions of the sub frames 18 and 18 and rear portions of the seat frames 17 and 17.

The rear end joining members 201 and 201 have a pair of left and right inwardly projecting pieces 202 and 202 attached to their inner side surfaces, respectively. The inwardly projecting pieces 202 and 202 are closer to the front of the vehicle body than the rear cross member 22 is and project inward in the vehicle width direction. Moreover, the rear end joining members 201 and 201 integrally include rearwardly projecting portions 201a and 201a projecting toward the rear of the vehicle body beyond the rear ends of the left and right seat frames 17 and 17.

Each inwardly projecting piece 202 and each rearwardly projecting portion 201a have bolt insertion holes 202a and 201b, respectively, into which to insert bolts for fastening the rear-side rear fender 64 to the vehicle body frame F.

The inwardly projecting piece 202 extends inward in the vehicle width direction from the corresponding rear end joining member 201 and is provided at a position allowing easy insertion of a bolt into the bolt insertion hole 202a from above. Likewise, the rearwardly projecting portion 201a extends toward the rear of the vehicle body beyond the rear ends of the seat frames 17 and is provided at a position allowing easy insertion of a bolt into the bolt insertion hole 201b from above.

The inwardly projecting piece 202 is arranged projecting inward in the vehicle width direction from the seat frame 17, and the rearwardly projecting portion 201a is arranged on an extension of the axis of the seat frame 17. Then, if the center-to-center distance between the bolt insertions holes 202a and 201b is S, the center-to-center distance S can be set larger than a case where the two bolt insertion holes are aligned in the front-rear direction along the seat frame 17. In this way, the span for the attachment of the rear-side rear fender 64 to the vehicle body frame F is increased, thereby allowing firmer attachment of the rear-side rear fender 64 to the vehicle body frame F.

As shown in FIGS. 2, 4, and 5 mentioned above, the seat frames 17 and 17 constituting the vehicle body frame F are attached to the main frame 14 through the suspension bracket 16. Thus, as compared to conventional structures in which seat frames are attached directly to a rear end portion of a main frame, it is possible to support the rear portion of the fuel tank 24 at the front ends of the seat frames 17 and 17. It is also possible to arrange the fuel tank 24 at a higher position with respect to the main frame 14, or to arrange the main frame 14 at a lower position with respect to the fuel tank 24. Accordingly, components may be arranged in a space formed between the main frame 14 and the fuel tank 24, allowing effective use of the space.

Figure 6:
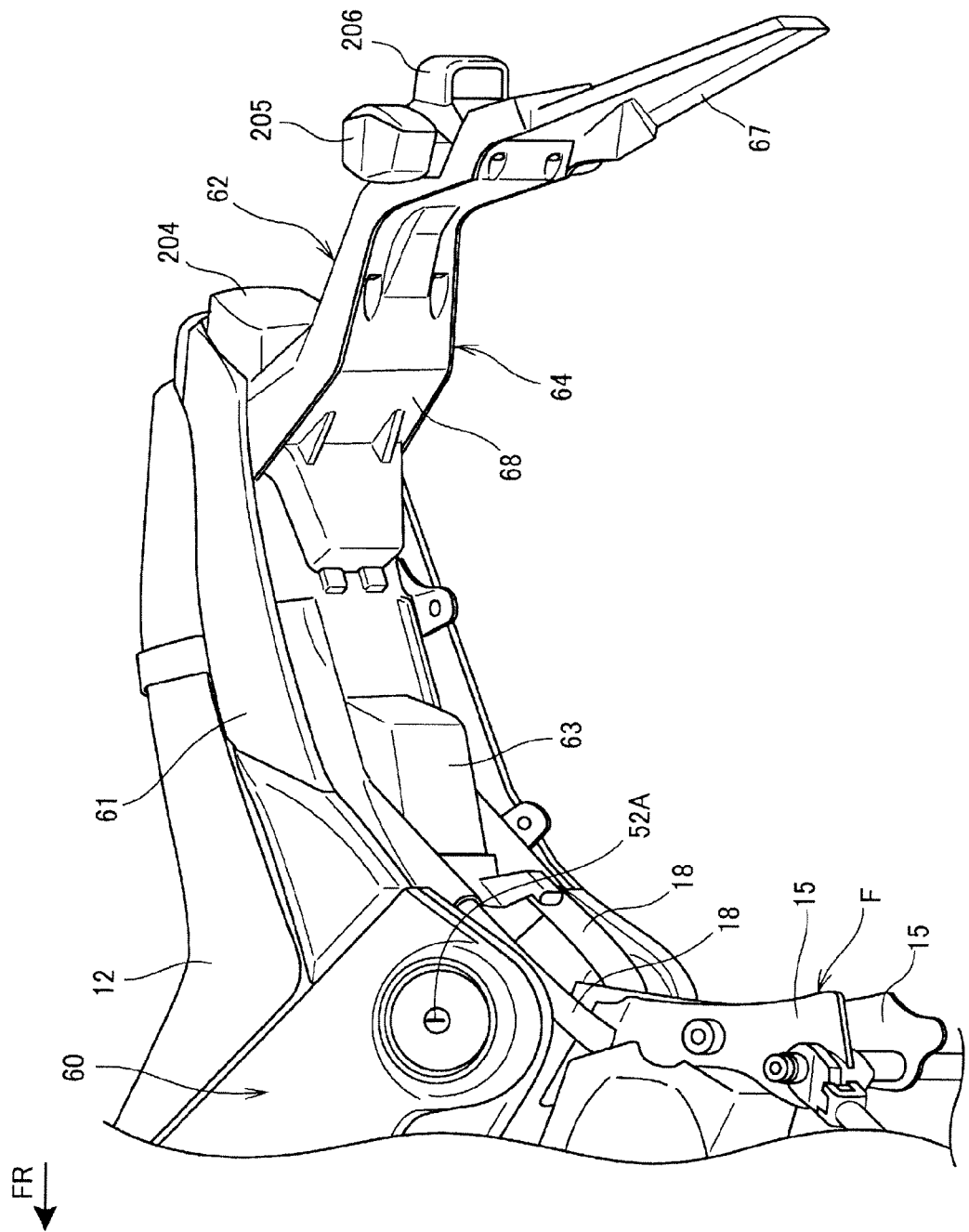
FIG. 6 is a perspective view showing a rear part of the vehicle body.
Figure 7:
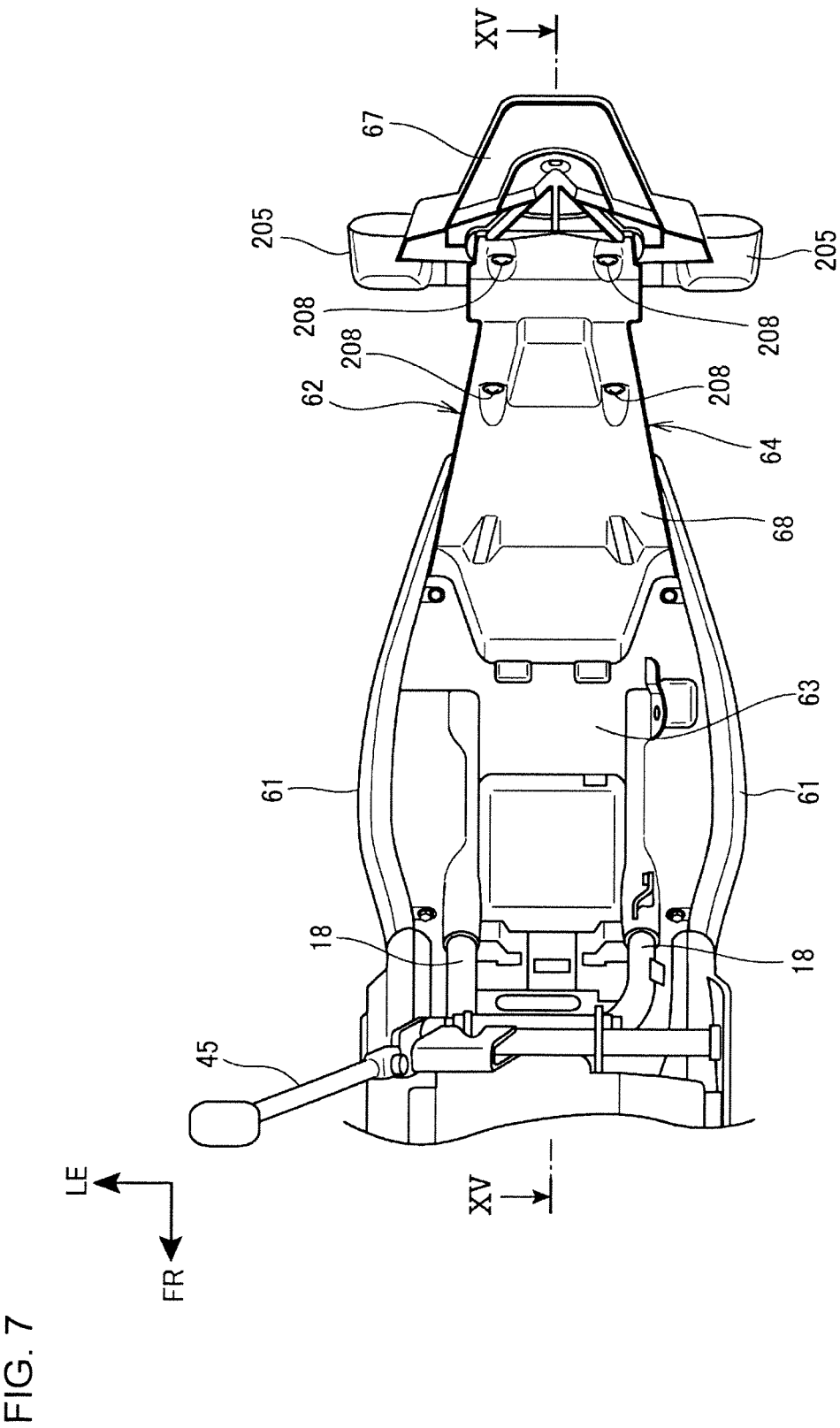
FIG. 7 is a bottom view showing the rear part of the vehicle body.

FIG. 6 is a perspective view showing the rear part of the vehicle body. FIG. 7 is a bottom view showing the rear part of the vehicle body.

As shown in FIGS. 6 and 7, the rear fender 62 is formed of the front-side rear fender 63 covering rear portions of the sub frames 18 and 18 and the seat frames 17 and 17 (see FIG. 5) from below, and the rear-side rear fender 64 attached to a rear portion of the front-side rear fender 63. The front-side rear fender 63 is arranged inside the left and right rear side covers 61 and 61 in the vehicle width direction. The rear-side rear fender 64 has its root portion arranged inside the left and right rear side covers 61 and 61 in the vehicle width direction and extends downwardly rearward.

As shown in FIG. 6, the rear-side rear fender 64 includes an outer fender 67 constituting an outer part, and an inner fender 68 attached to the inner side of the outer fender 67. Note that reference numeral 204 denotes a tail light projecting rearward beyond the left and right rear side covers 61 and 61. 205 and 205 are rear directional signals attached to both side portions of the rear-side rear fender 64, respectively. 206 is a license light attached to the rear surface of the rear-side rear fender 64 for illuminating the license plate (not shown).

Figure 8:
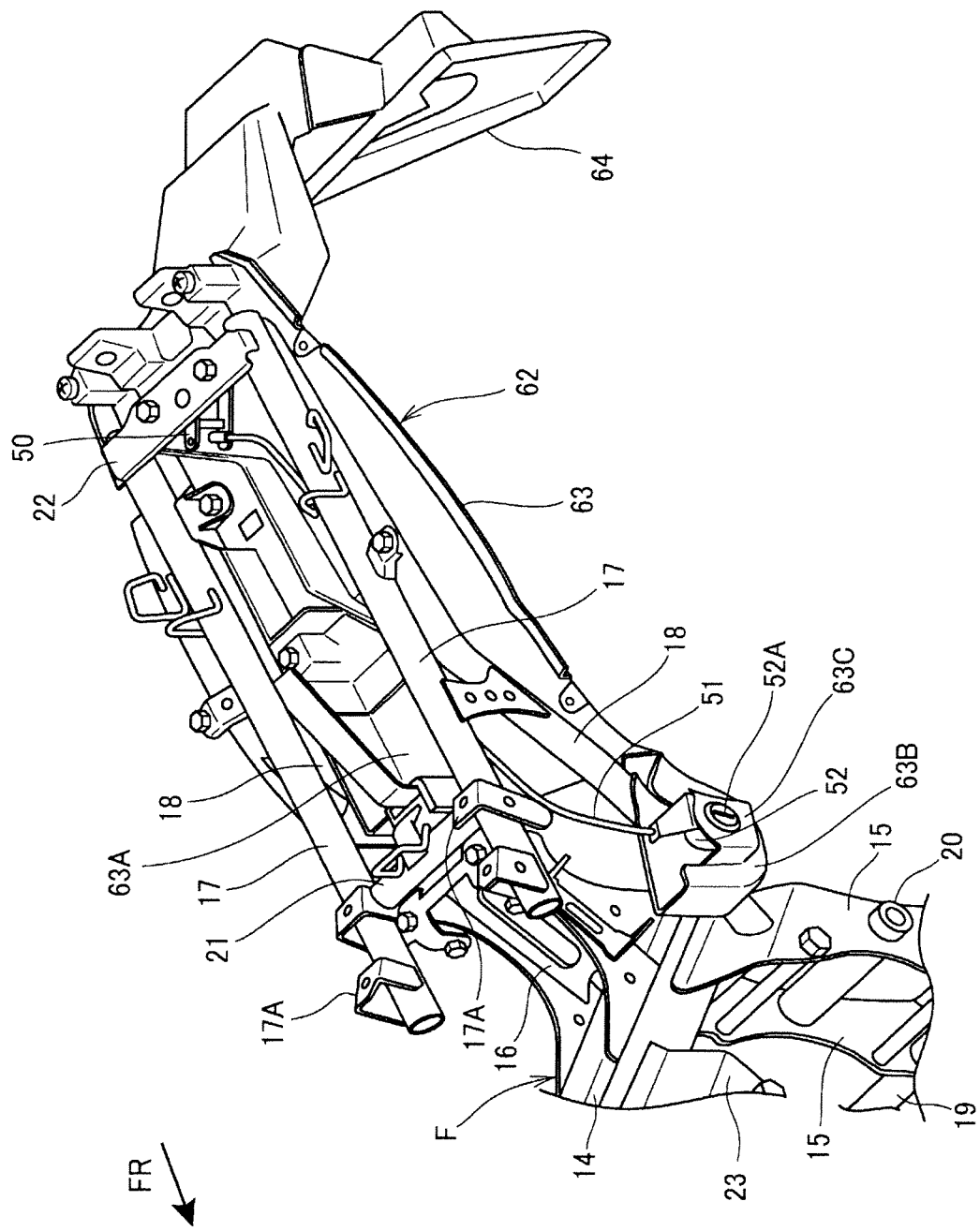
FIG. 8 is a perspective view showing a rear part of the vehicle body frame and a rear fender.

FIG. 8 is a perspective view showing a rear part of the vehicle body frame F and the rear fender 62.

The front-side rear fender 63 is formed in the shape of a single tray covering the left and right seat frames 17 and 17 from below and extends from middle portions, in the front-rear direction, of the sub frames 18 and 18 to the rear of the seat frames 17 and 17. A battery housing portion 63A to house the vehicle's battery (not shown) is formed at a front portion of the front-side rear fender 63.

A cylinder housing portion 63B extending downwardly forward is formed integrally at the front end of the front-side rear fender 63 on one side in the vehicle width direction (left side). The cylinder housing portion 63B is formed in a box shape with its upper side being open and extends forward along the outer side surface of the left sub frame 18.

A key cylinder 52 is supported in the cylinder housing portion 63B. The key cylinder 52 is arranged with its key insertion hole 52A facing outward in the vehicle width direction. A cylinder support portion 63C supports the key cylinder 52 and constitutes the outer sidewall of the cylinder housing portion 63B. This cylinder support portion 63C bulges outward in the vehicle width direction.

The rear cross member 22 is provided with a seat catcher 50 of a seat lock mechanism that locks the seat 12 (see FIG. 1) in a closed state. An engaging portion (not shown) projecting downward is provided on a rear portion of the seat 12. The seat 12 is set to the locked state when this engaging portion engages the seat catcher 50. The locked state of the seat 12 is released by operating the key cylinder 52 connected to the seat catcher 50 through an operation wire 51. The locked seat catcher 50 is unlocked by inserting the main key or the like of the vehicle into the key cylinder 52 and turning the key cylinder 52.

Figure 9:
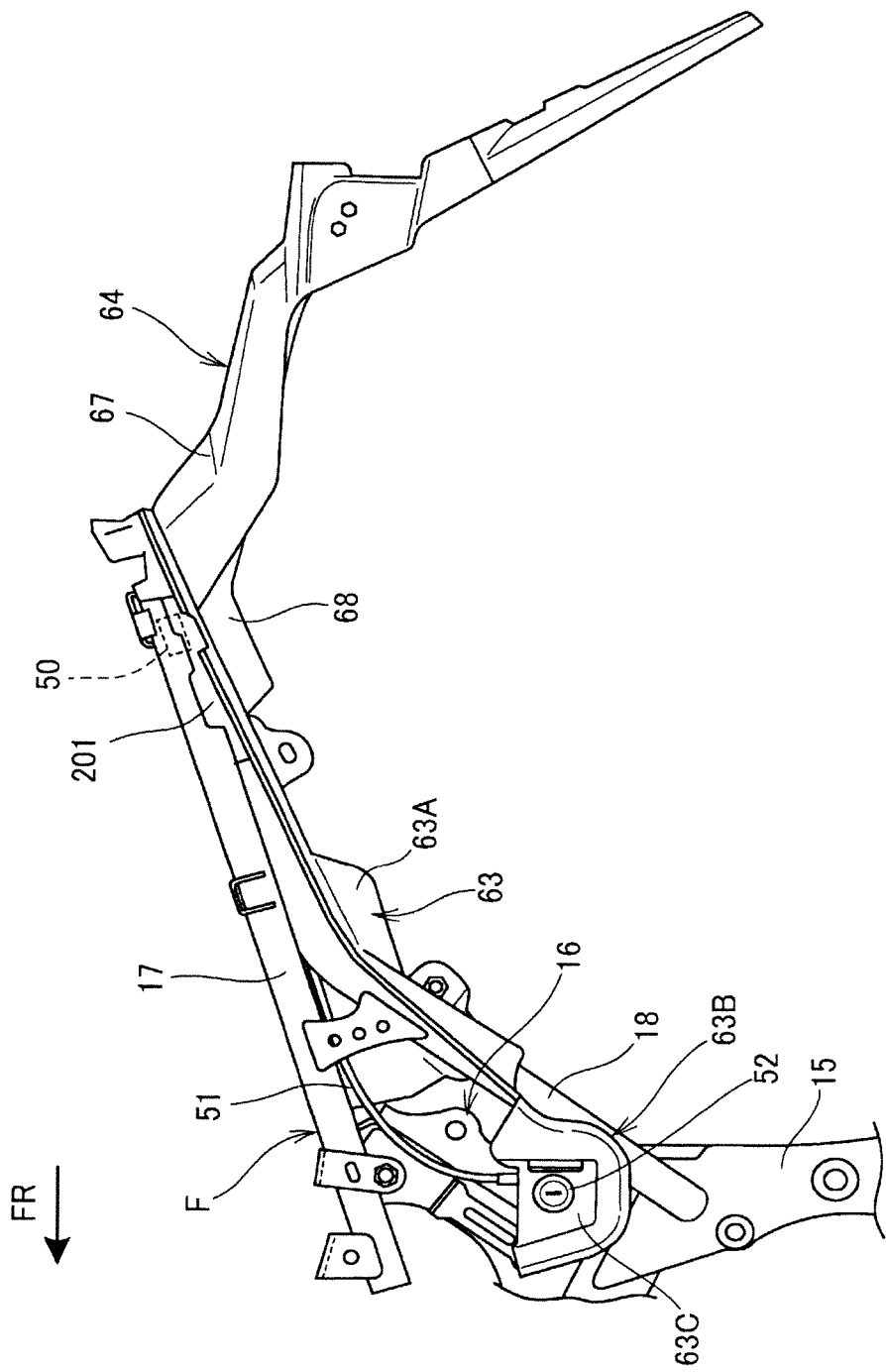
FIG. 9 is a side view showing the rear part of the vehicle body.
Figure 10:
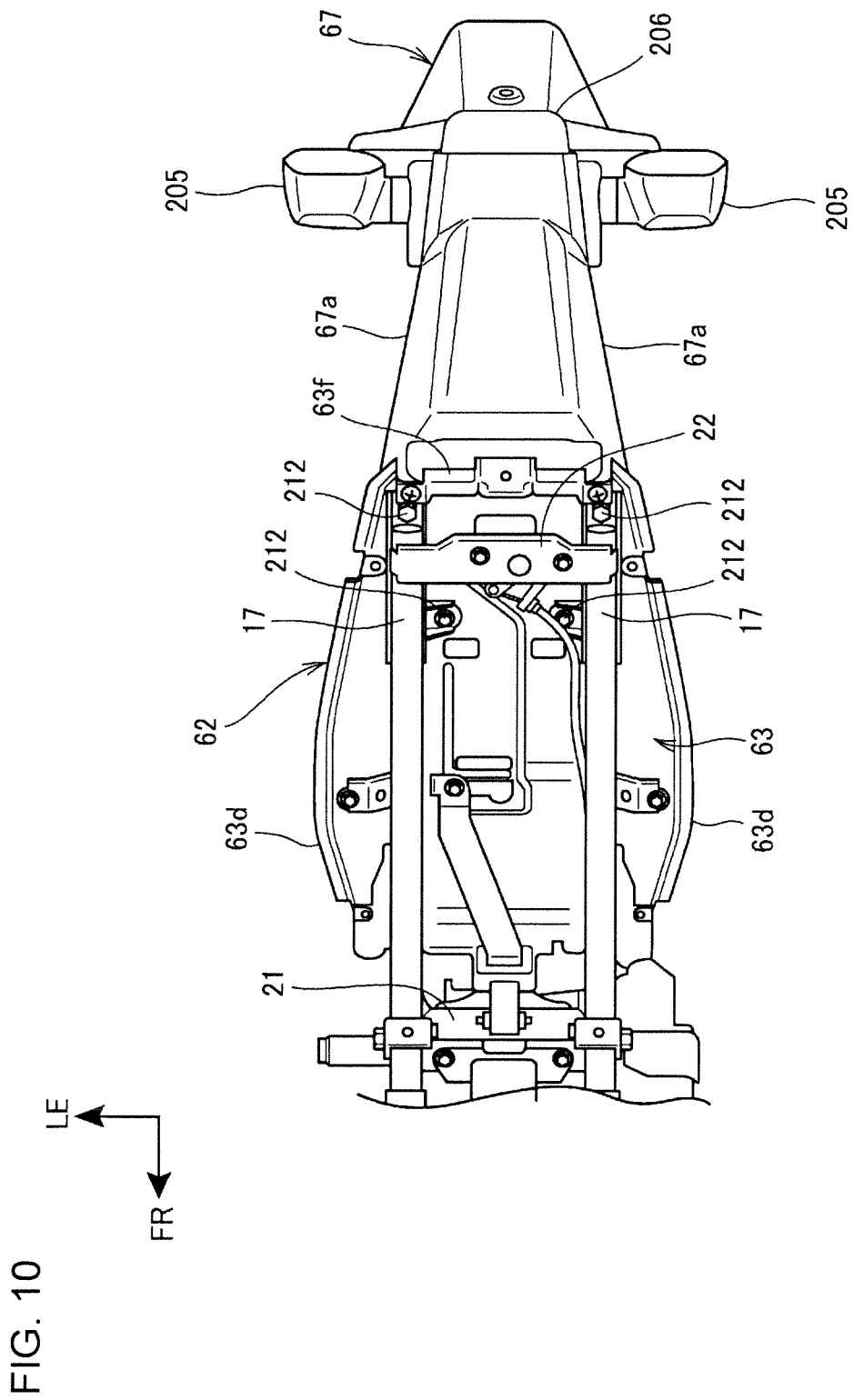
FIG. 10 is a plan view showing the rear part of the vehicle body.

FIG. 9 is a side view showing the rear part of the vehicle body. FIG. 10 is a plan view showing the rear part of the vehicle body.

As shown in FIG. 9, the rear-side rear fender 64 is attached to a rear lower portion of the front-side rear fender 63. Both side portions of the front-side rear fender 63 are arranged along the lower surfaces of the sub frames 18 and 18 (the right sub frame is not shown), respectively. The cylinder housing portion 63B is arranged overlapping the upper end of the left center frame 15, the suspension bracket 16, and the left sub frame 18 in a side view. The operation wire 51 for the seat catcher 50 (see FIG. 8) extends while curving upwardly rearward from the key cylinder 52 toward the seat catcher 50 along the left seat frame 17.

An upper portion of the inner fender 68 of the rear-side rear fender 64 extends along the rear end joining members 201 farther toward the front of the vehicle body than does an upper portion of the outer fender 67.

As shown in FIG. 10, left and right side edges 63d and 63d of the front-side rear fender 63 are curved, bulging outward in the vehicle width direction. A rear edge 63f of the front-side rear fender 63 is located closer to the rear of the vehicle body than are the left and right seat frames 17 and 17 and the rear ends of the rear end joining members 201 and 201, and extends in such a way that the left and right side edges 63d and 63d of the front-side rear fender 63 and left and right side surfaces 67a and 67a of the outer fender 67 appear continuous with each other, respectively, in a plan view.

Figure 11:
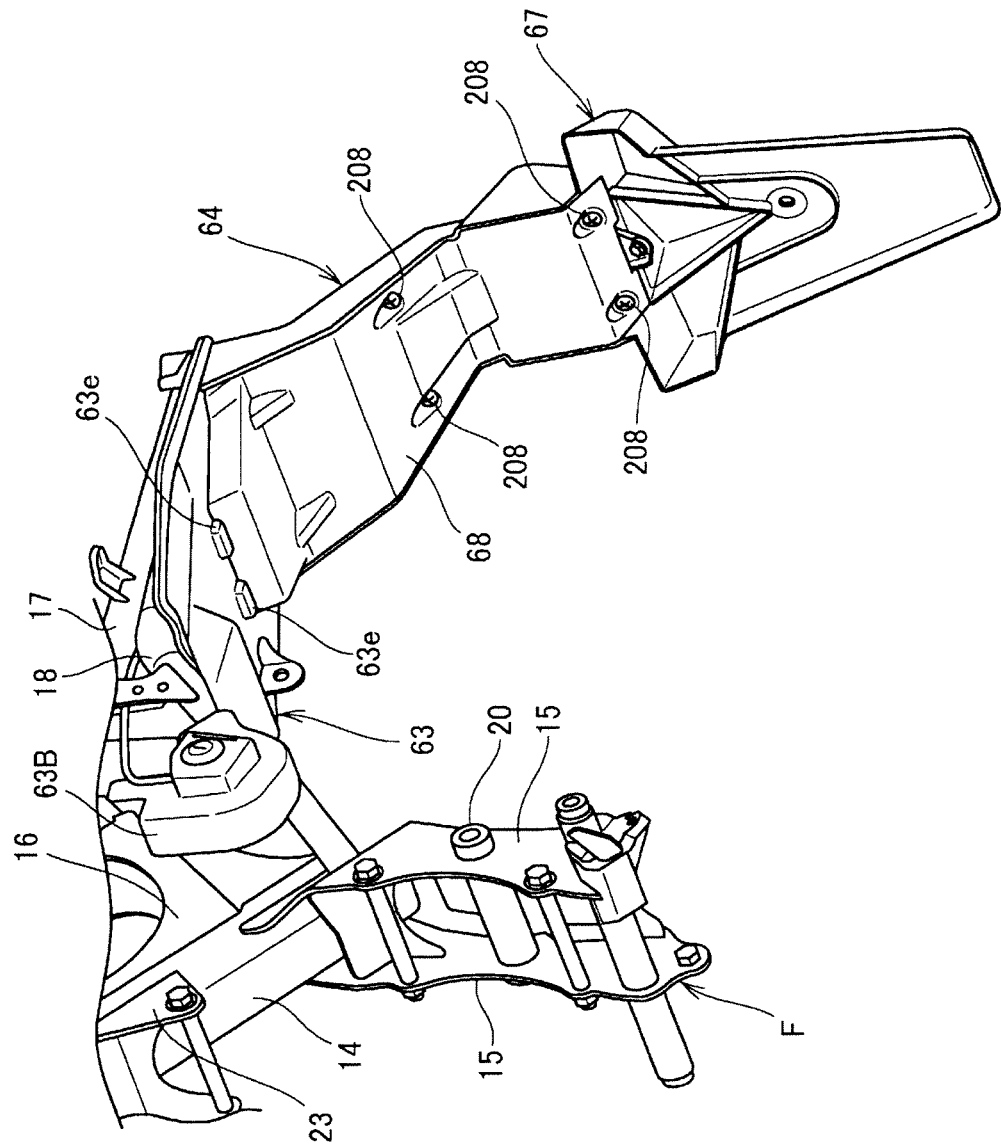
FIG. 11 is a perspective view showing the attached state of a rear-side rear fender.
Figure 12:
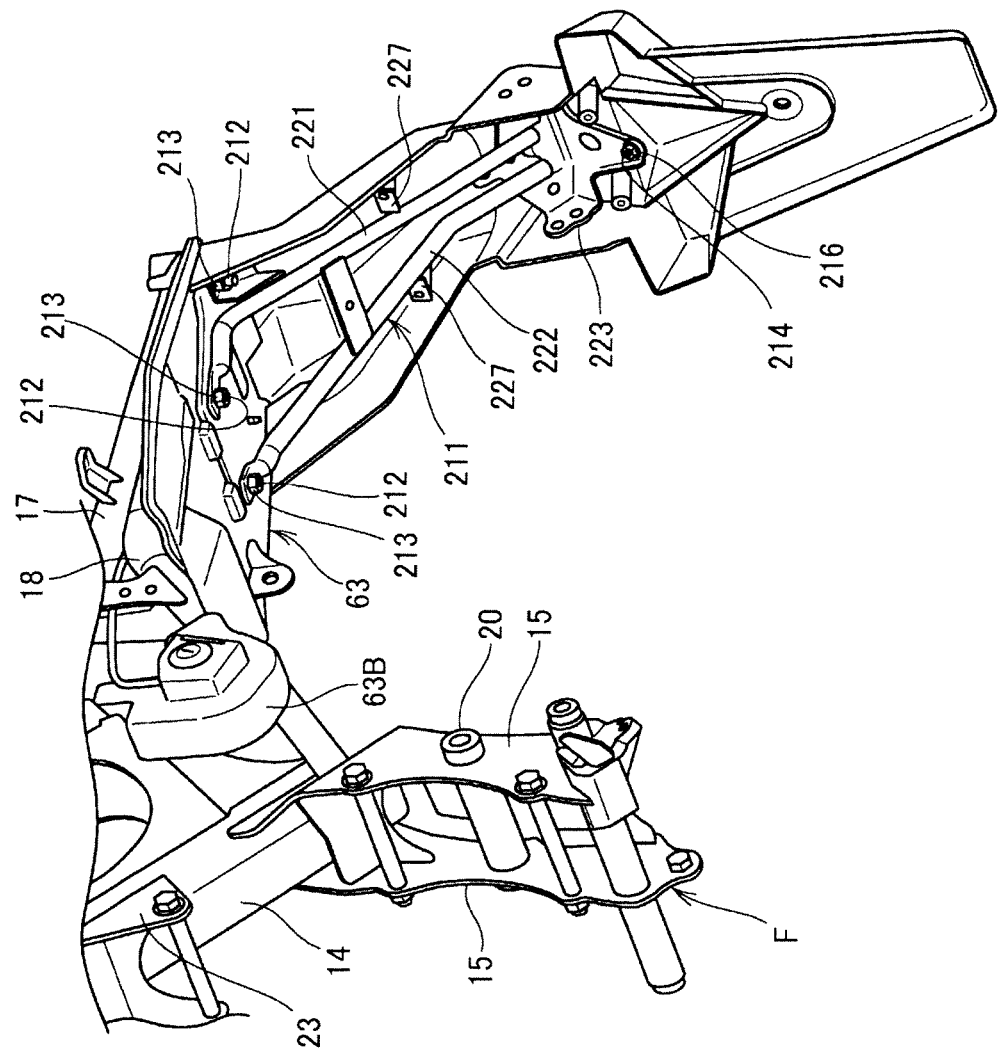
FIG. 12 is a perspective view showing a state where an inner fender is removed from the rear-side rear fender shown in FIG. 11.

FIG. 11 is a perspective view showing the attached state of the rear-side rear fender 64. FIG. 12 is a perspective view showing a state where the inner fender 68 is removed from the rear-side rear fender 64 shown in FIG. 11.

As shown in FIG. 11, a pair of left and right upper engaging portions (not shown) formed in an upper front portion of the inner fender 68 of the rear-side rear fender 64 are engaged with a pair of left and right engaged portions 63e and 63e formed in a projecting shape on the lower surface of the front-side rear fender 63. Moreover, the inner fender 68 is coupled to the inner side of the outer fender 67 with multiple screws 208.

As shown in FIG. 12, inside the rear-side rear fender 64 (see FIG. 11), there is a rear stay 211 arranged with an upper portion thereof being attached to the rear part of the vehicle body frame F. The rear stay 211 is fastened to the rear part of the vehicle body frame F together with a rear portion of the front-side rear fender 63 and a front portion of the rear-side rear fender 64, with multiple bolts 212 and nuts 213. A lower portion of the outer fender 67 is attached to a lower end portion of the rear stay 211 with a bolt 214 and a nut 216.

Figure 13:
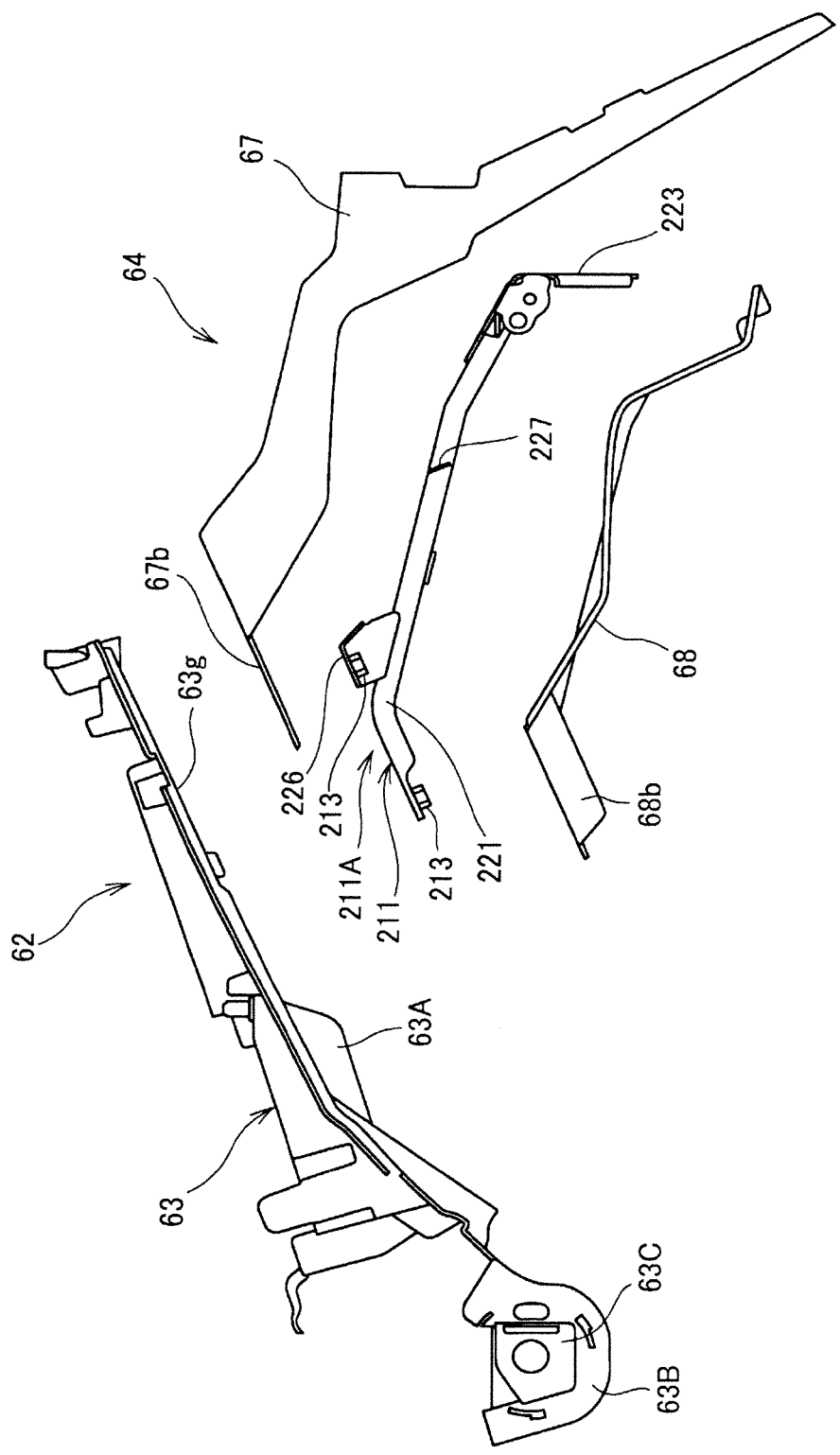
FIG. 13 is an exploded side view showing the configuration of the rear fender.

FIG. 13 is an exploded side view showing the configuration of the rear fender 62.

The rear fender 62 is formed of the front-side rear fender 63 and the rear-side rear fender 64 attached to the rear portion of the front-side rear fender 63. The rear-side rear fender 64 is formed of the outer fender 67 located outside, the inner fender 68 arranged inside the outer fender 67, and the rear stay 211 arranged inside the outer fender 67 and the inner fender 68.

The front-side rear fender 63 has a flat rear plate portion 63g at a rear portion thereof, and the outer fender 67 has a flat front plate portion 67b at a front portion thereof. These rear plate portion 63g and front plate portion 67b are vertically overlapped with each other and attached to the vehicle body frame side. A substantially box-shaped portion 68b with its upper and rear sides open is formed at a front portion of the inner fender 68. When the inner fender 68 is mounted to the outer fender 67, the box-shaped portion 68b comes into contact with the lower surface of the front plate portion 67b of the outer fender 67 and covers a fastening portion 211A (a portion including the nuts 213 and 213 and their periphery) provided in the rear stay 211 for fastening the rear stay 211 to the vehicle body frame side. Thus, the fastening portion 211A is not exposed to the outside.

Figure 14:
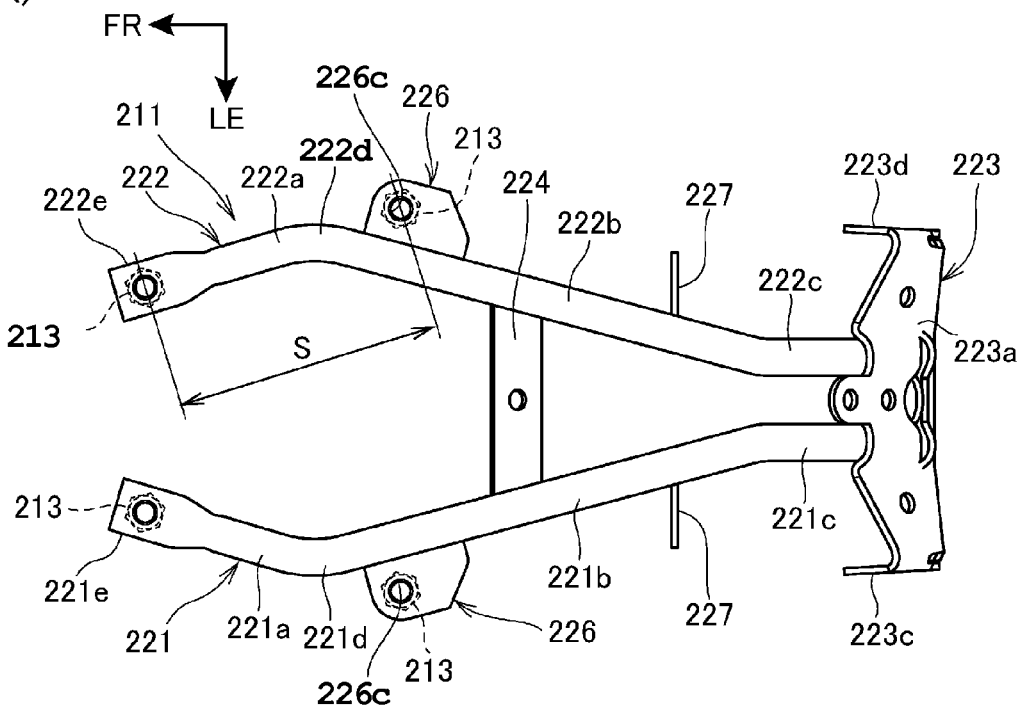
FIGS. 14A and 14B are explanatory views of a rear stay.
Figure 14:
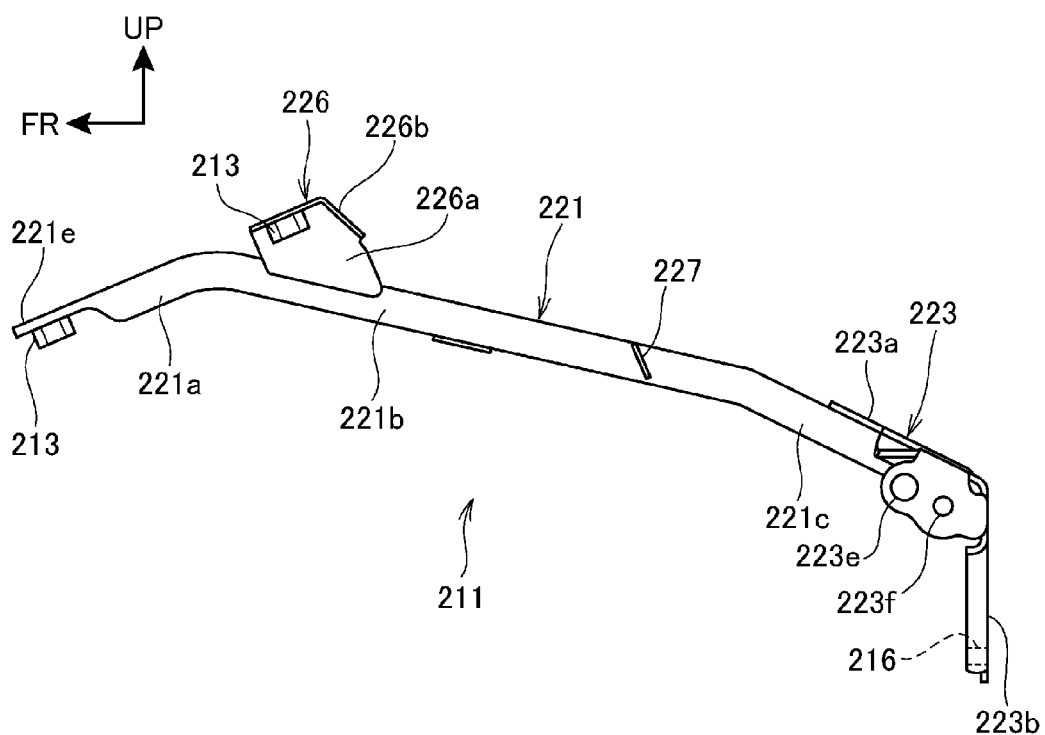

FIGS. 14A and 14B are explanatory views of the rear stay 211. FIG. 14A is a plan view of the rear stay 211, and FIG. 14B is a side view of the rear stay 211 in the state of being attached to the vehicle body.

As shown in FIG. 14A, the rear stay 211 includes a left stay member 221 and a right stay member 222 having a bilaterally symmetrical shape in a plan view. A rear plate 223 is attached to rear end portions of these left stay member 221 and right stay member 222. A cross plate 224 joins middle portions of the left stay member 221 and right stay member 222 to each other. Front attachment brackets 226 and middle attachment brackets 227 are attached to the left stay member 221 and the right stay member 222 in such a way as to project laterally.

The left stay member 221 and the right stay member 222 include front portions 221a and 222a, middle portions 221b and 222b, and rear portions 2217c and 222c, respectively. The front portions 221a and 222a are formed in such a way as to approach each other as they get closer to the front, in a plan view. The middle portions 221b and 222b straightly extend rearward continuously from the rear ends of the front portions 221a and 222a in such a way as to approach each other as they get closer to the rear, in a plan view. The rear portions 221c and 222c extend rearward continuously from the rear ends of the middle portions 221b and 222b, in a plan view. The left stay member 221 is bent in a generally S shape as a whole, while the right stay member 222 is bent in a shape bilaterally symmetrical to the left stay member 221. Bent portions 221d and 222d between the front portions 221a and 222a and the middle portions 221b and 222b project farthest in the vehicle width direction. The front attachment brackets 226 are arranged near these bent portions 221d and 222d.

As shown in FIGS. 14A and 14B, the left stay member 221 and the right stay member 222 have vertically flat portions 221e and 222e at front end portions thereof. Nuts 213 are welded to the lower surfaces of these flat portions 221e and 222e, respectively. Note that reference numerals 221f denote bolt insertion holes bored in the flat portion 221e and 222e.

The left stay member 221 and the right stay member 222 are formed overlapping each other in a side view. The front portions 221a and 222a are formed extending upwardly rearward. The middle portions 221b and 222b are formed extending downwardly rearward. The rear portions 221c and 222c are formed extending downwardly rearward at a steeper angle than the middle portions 221b and 222b.

The rear plate 223 is an integrally molded member formed of an upper inclined portion 223a facing upwardly rearward, a lower inclined portion 223b formed continuously from the lower edge of this upper inclined portion 223a and facing downwardly rearward, and left and right side bent portions 223c and 223d having a flat plate shape and bent downwardly forward at substantially a right angle from both ends of the upper inclined portion 223a. The upper inclined portion 223a is a portion to be attached to the rear portions 221c and 222c of the left and right stay members 221 and 222. The nut 216, which the bolt 214 (see FIG. 12) is screwed into at the time of attaching the outer fender 67 (see FIG. 12) to the rear stay 211, is welded to the front surface in the center of a lower edge portion of the lower inclined portion 223b. A bolt insertion hole 223e and a wiring insertion hole 223f are bored in each of the side bent portions 223c and 223d. The bolt insertion hole 223e is a hole to insert a bolt for attaching the corresponding rear directional signal 205 (see FIG. 10) with the outer fender 67 (see FIG. 10) in between. The wiring insertion hole 223f is a hole to insert a harness to be connected to the rear directional signal 205.

The front attachment brackets 226 are each formed of a vertical portion 226a extending vertically and a laterally extending portion 226b extending laterally from the upper edge of this vertical portion 226a. The lower edge of the vertical portion 226a is attached to the corresponding left stay member 221 or right stay member 222. A nut 213 is welded to the lower surface of the laterally extending portion 226b. Note that reference numerals 226c denote bolt insertion holes bored in the laterally extending portions 226b.

The middle attachment brackets 227 have a flat plate shape and are attached to the left stay member 221 and the right stay member 222 while extending outward in the vehicle width direction. Screw insertion holes (not shown) to insert the screws 208 (see FIG. 11) are bored in the middle attachment brackets 227.

The center-to-center distance between the bolt insertion hole 221f of the flat portion 221e or 222e and the bolt insertion hole 226c of the corresponding front attachment bracket 226 is S, and this center-to-center distance S is set larger. Accordingly, the rear stay 211 can be attached more firmly to the vehicle body frame F (see FIG. 5).

Figure 15:
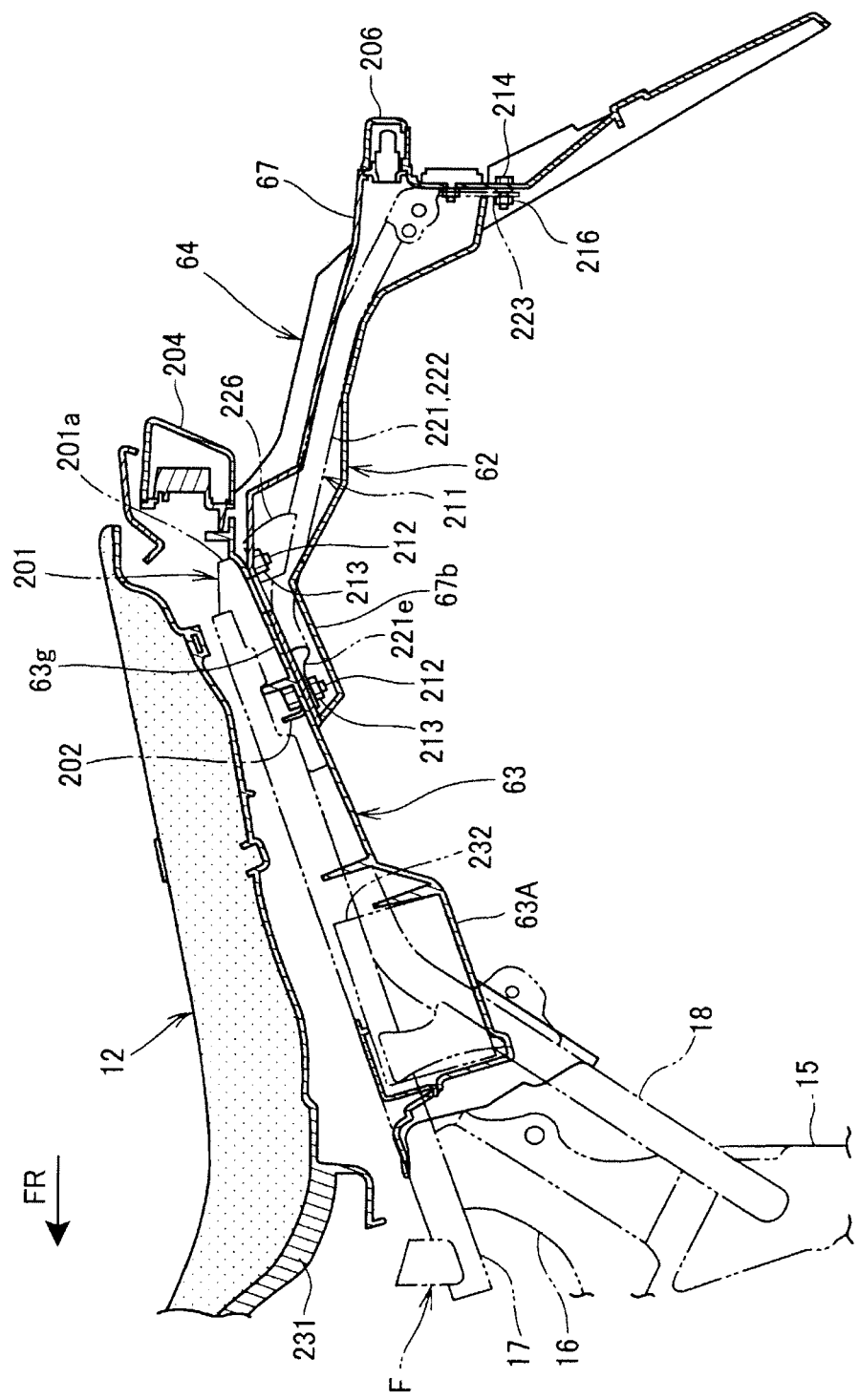
FIG. 15 is a cross-sectional view taken along line XV-XV in FIG. 7.

FIG. 15 is a cross-sectional view taken along line XV-XV in FIG. 7.

The front-side rear fender 63 is arranged under a bottom plate 231 constituting the seat 12. The battery housing portion 63A bulging downward is formed at a front portion of the front-side rear fender 63. A battery 232 is arranged in the battery housing portion 63A. Moreover, the rear stay 211 for reinforcement is arranged inside the rear-side rear fender 64.

The nuts 213 are provided on the flat portion 221e and 222e and the front attachment brackets 226 at an upper portion of the rear stay 211, respectively. The bolts 212 inserted in the inwardly projecting pieces 202 on the vehicle body frame F side are screwed in the nuts 213 of the flat portion 221e and 222e. The bolts 212 inserted in the rearwardly projecting portions 201a on the vehicle body frame F side are screwed in the nuts 213 of the front attachment brackets 226.

The nut 216 is provided on the front surface of the lower end portion of the rear plate 223 at a lower portion of the rear stay 211. The bolt 214 inserted in the outer fender 67 from the rear of the vehicle body is screwed in the nut 216.

The rear plate 223 of the rear stay 211 supports the license light 206 through a support member 225. Thus, the rear stay 211 serves also as a license-light stay.

As described above, the rear stay 211 is attached to the rear end joining members 201 side which has high rigidity and joins the seat frames 17 and the sub frames 18 to each other. In addition, the rear stay 211 is attached at multiple points (at four points in this embodiment). Thus, the rear stay 211 can be coupled firmly to the rear end joining members 201 side. Accordingly, the rear stay 211 can increase the strength for supporting the rear-side rear fender 64.

The rear plate portion 63g of the front-side rear fender 63 extends toward the rear of the vehicle body beyond the rear end of the vehicle body frame F, i.e. beyond the rear ends of the rear end joining members 201. Thus, even when the rear-side rear fender 64 is removed, the vehicle body frame F is still covered from below with the front-side rear fender 63 and is therefore not exposed to the outside. Accordingly, the exterior can be improved.

Figure 16:
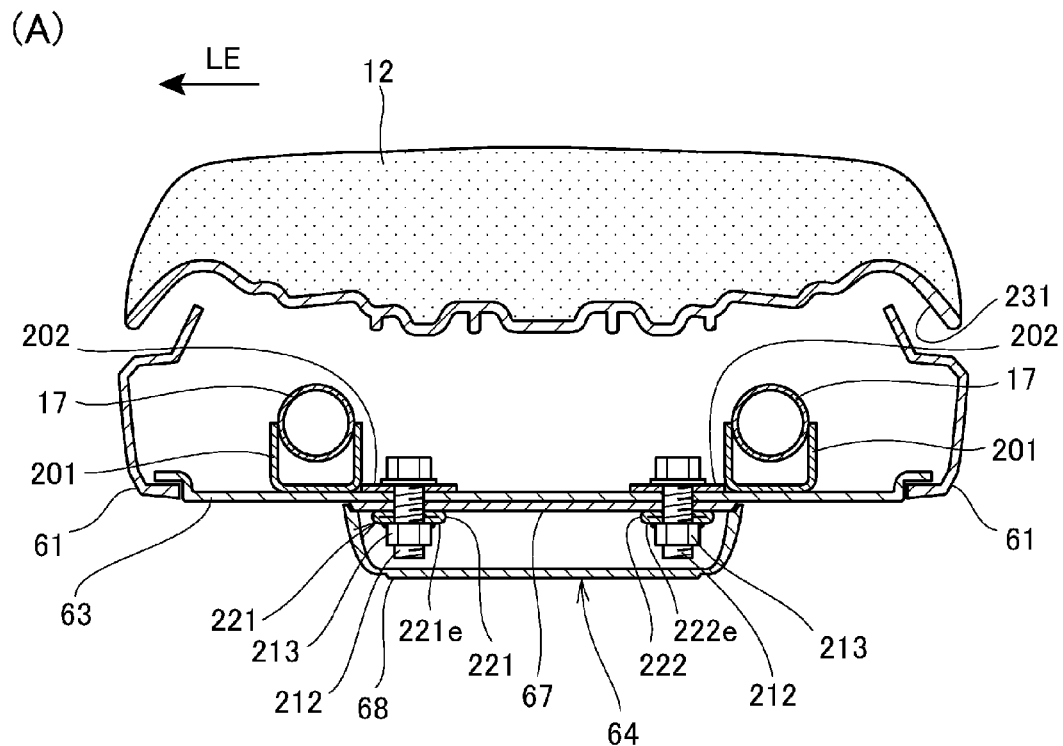
FIGS. 16A and 16B are cross-sectional views showing the structure of attachment of the rear stay to the vehicle body frame.
Figure 16:
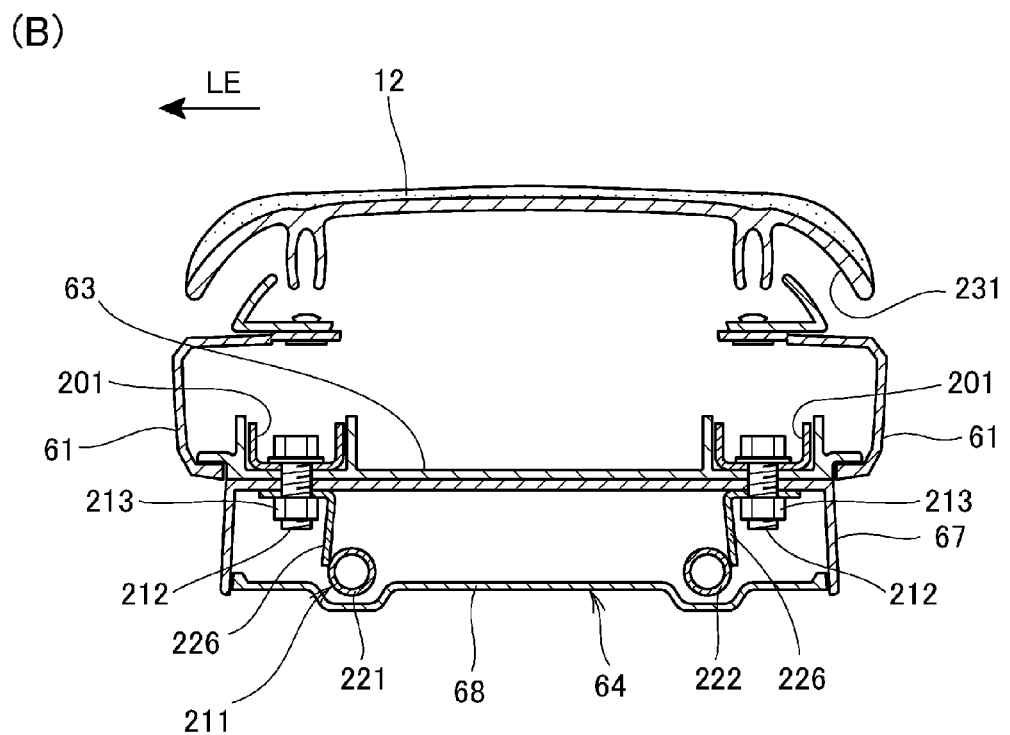

FIGS. 16A and 16B are cross-sectional views showing the structure of the attachment of the rear stay 211 to the vehicle body frame F. FIG. 16A is a cross-sectional view taken along line XVIA-XVIA in FIG. 1, and FIG. 16B is a cross-sectional view taken along line XVIB-XVIB in FIG. 1.

As shown in FIG. 16A, the rear end joining members 201 having a U cross-sectional shape are attached to rear lower portions of the left and right seat frames 17 and 17 supporting the seat 12, respectively. Moreover, the inwardly projecting pieces 202 are attached to the inner side surfaces of lower portions of the rear end joining members 201, respectively. The front-side rear fender 63 and the outer fender 67 of the rear-side rear fender 64 are fastened to the inwardly projecting pieces 202 and 202 together with the rear stay 211. Specifically, the front-side rear fender 63 and the outer fender 67 are arranged on the lower surfaces of the inwardly projecting pieces 202 with the front-side rear fender 63 being on top of the outer fender 67. In a state where the flat portion 221e and 222e of the rear stay 211 are in contact with the lower surface of the outer fender 67, the bolts 212 are inserted into the inwardly projecting pieces 202, the front-side rear fender 63, the outer fender 67, and the flat portion 221e and 222e from above in this order. Tip portions of the bolts 212 are screwed into the nuts 213 attached to the flat portion 221e and 222e. Then, the inner fender 68 is set to cover the rear stay 211 including the flat portion 221e and 222e and the nuts 213 from below.

As shown in FIG. 16B, the front-side rear fender 63 and the outer fender 67 of the rear-side rear fender 64 are fastened to the left and right rear end joining members 201 and 201 together with the rear stay 211. Specifically, the front-side rear fender 63 and the outer fender 67 of the rear-side rear fender 64 are arranged on the lower surfaces of the rearwardly projecting portions 201a of the rear end joining members 201 with the front-side rear fender 63 being on top of the outer fender 67. In a state where the front attachment brackets 226 of the rear stay 211 are in contact with the lower surface of the outer fender 67, the bolts 212 are inserted into the rearwardly projecting portions 201a, the front-side rear fender 63, the outer fender 67, and the front attachment brackets 226 from above in this order. Tip end portions of the bolts 212 are screwed into the nuts 213 attached to the front attachment brackets 226. Then, the inner fender 68 is set to cover the rear stay 211 including the front attachment brackets 226 and the nuts 213 from below.

Next, description will be given of how the rear-side rear fender 64 is removed from the rear fender 62 described above.

Figure 17:
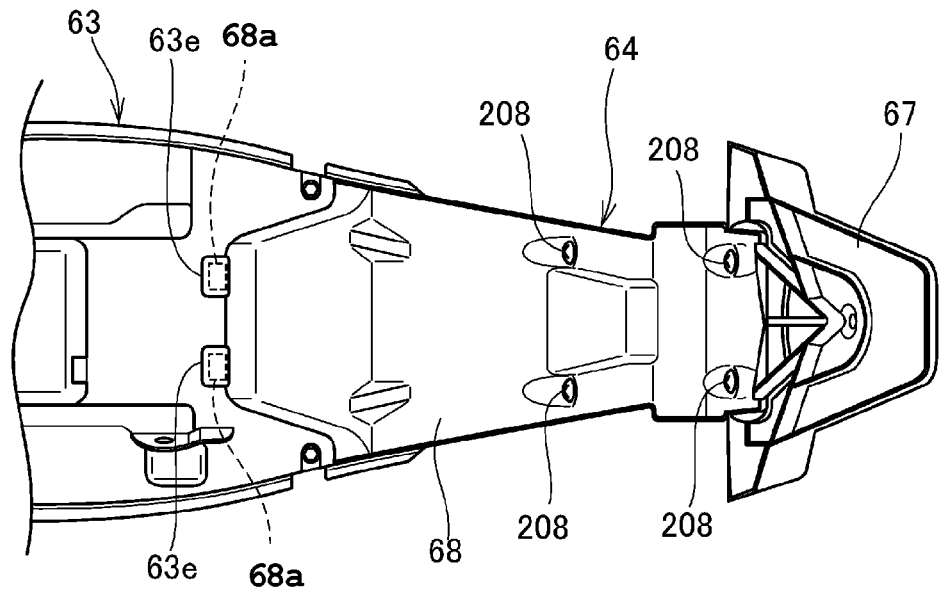
FIGS. 17A and 17B are operation diagrams describing how the rear-side rear fender is removed (first part).
Figure 17:
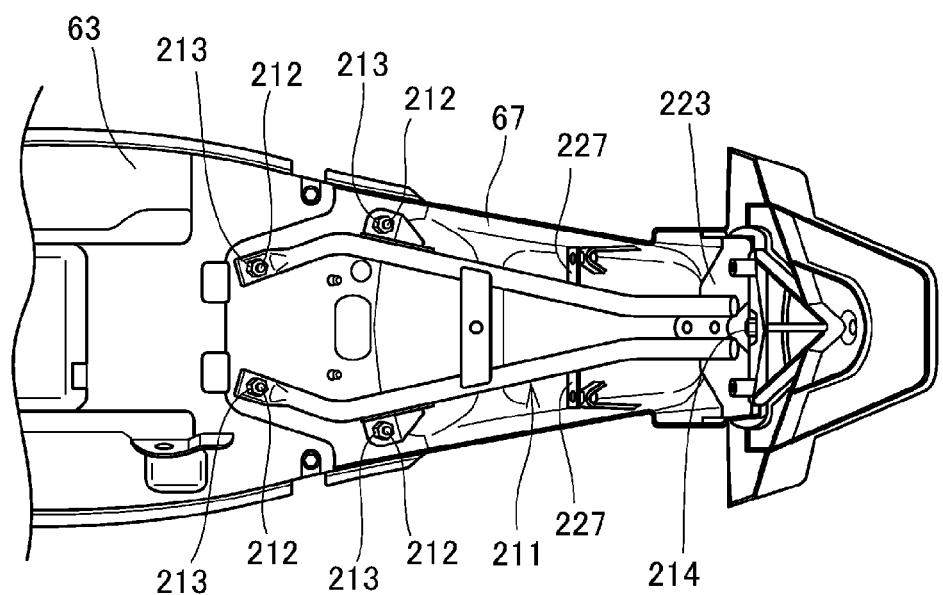
Figure 18:
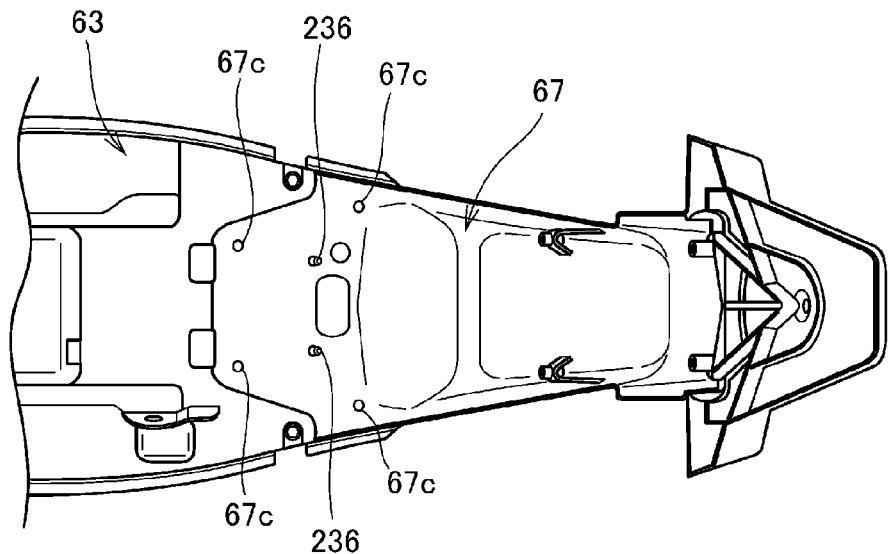
FIGS. 18A and 18B are operation diagrams describing how the rear-side rear fender is removed (second half).
Figure 18:
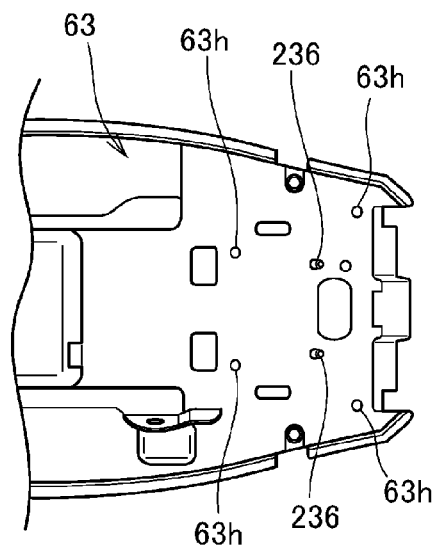

FIGS. 17A and 17B are operation diagrams describing how the rear-side rear fender 64 is removed (first half). FIG. 17A is an operation diagram showing a state before the removal of the rear-side rear fender 64, and FIG. 17B is an operation diagram showing a state after removal of the inner fender 68. FIGS. 18A and 18B are operation diagrams describing how the rear-side rear fender 64 is removed (second half). FIG. 18A is an operation diagram showing a state after removal of the rear stay 211, and FIG. 18B is an operation diagram showing a state after removal of the outer fender 67.

First, in the state of FIG. 17A, the multiple screws 208 fastening the outer fender 67 and the inner fender 68 are loosened and removed. Then, left and right upper engaging portions 68a and 68a formed at the front end of the inner fender 68 engaged with the engaged portions 63e of the front-side rear fender 63 are pulled out rearward to release the engagement. Thereafter, the inner fender 68 is removed from the front-side rear fender 63 and the outer fender 67. As a result, the state of FIG. 17B is obtained.

Next, referring to FIG. 17B, the multiple bolts 212 fastening the front-side rear fender 63, the outer fender 67, and the rear stay 211 together to the vehicle body frame are loosened. Moreover, the bolt 214 attaching the outer fender 67 to the rear plate 223 of the rear stay 211 is loosened, so that the rear stay 211 is removed. As a result, the state of FIG. 18A is obtained. Further, the outer fender 67 is also removed from the front-side rear fender 63, so that the state of FIG. 18B is obtained. As described above, it is possible to easily remove only the rear-side rear fender 64 of the rear fender 62.

By fastening the front-side rear fender 63, the outer fender 67, and the rear stay 211 together to the vehicle body frame, it is possible to reduce the number of fastening members such as the bolts and nuts, the man-hour for the machining of the attachment holes and the like, and the man-hour for assembly, as compared to the case of separately mounting the front-side rear fender 63, the outer fender 67, and the rear stay 211 to the vehicle body frame. Accordingly, it is possible to achieve both cost reduction and productivity improvement.

Note that reference numerals 67c in FIG. 18A denote bolt insertion holes bored in the outer fender 67 for inserting the bolts 212 (see FIG. 17B). Reference numerals 63h in FIG. 18B denote bolt insertion holes bored in the front-side rear fender 63 for inserting the bolts 212. Reference numerals 236 in FIGS. 18A and 18B denote positioning pins provided projecting downward from the bottom surface of the front-side rear fender 63 and are parts designed to position the outer fender 67 with respect to the front-side rear fender 63.

Figure 19:
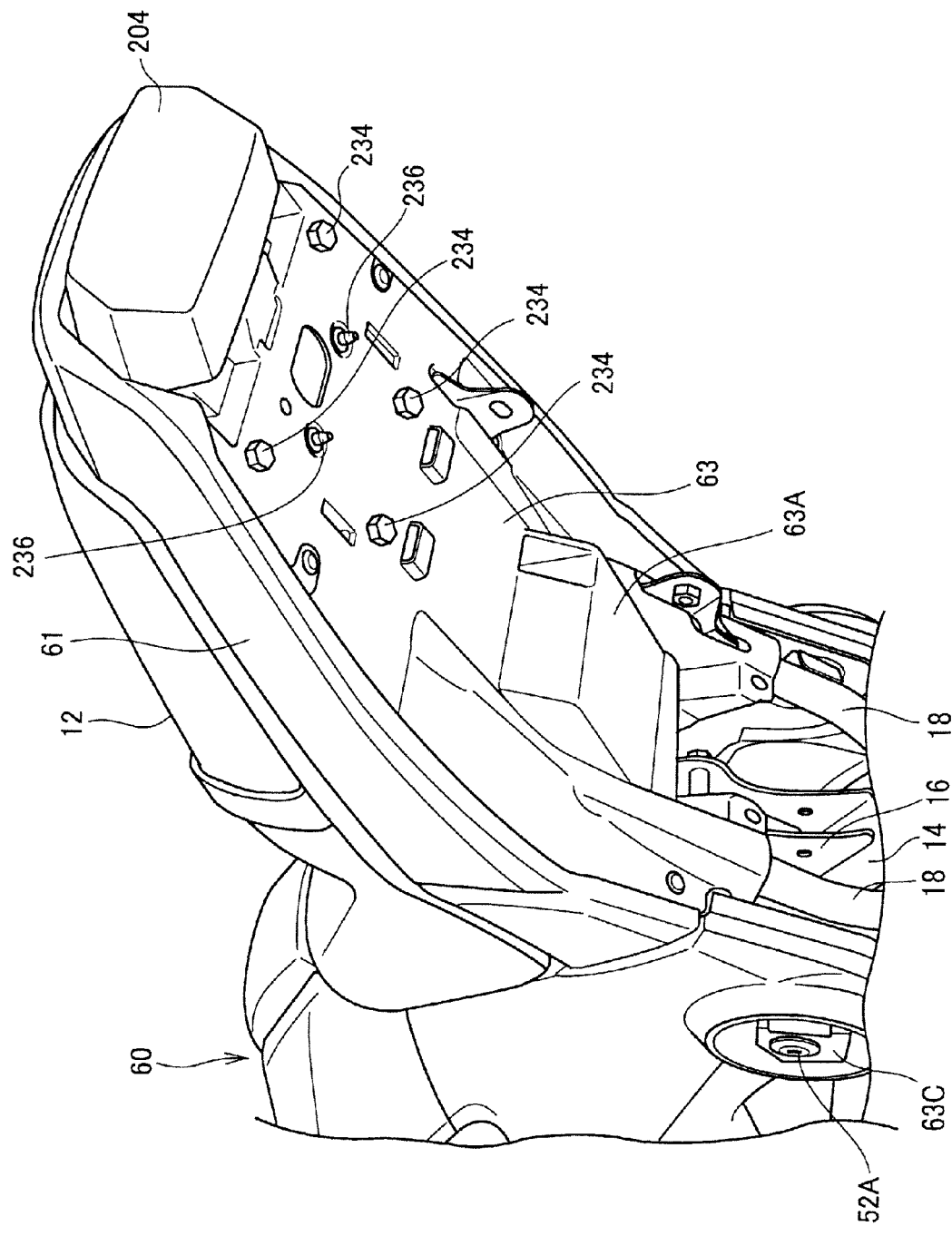
FIG. 19 is a perspective view showing the state after the removal of the rear-side rear fender from a rear part of the vehicle body.

FIG. 19 is a perspective view showing the state after the removal of the rear-side rear fender from the rear part of the vehicle body.

Of the two fenders of the rear fender 62, it is possible to remove the rear-side rear fender 64 (see FIG. 17A) and leave the front-side rear fender 63 and then fix the front-side rear fender 63 to the vehicle body frame with multiple bolts 234 and nuts (not shown) utilizing the original attachment holes. For example, in the case of riding on a non-public road not designed for general transportation purposes such as a closed course (circuit or the like), it is possible to ride the vehicle with the rear-side rear fender 64 being removed as described above in accordance with the rider's preference or for the purpose of improving the riding performance.

As shown in FIGS. 1, 6, and 15 mentioned above, the motorcycle 1 is a saddle-ride type vehicle including the rear fender 62 which is attached above the rear wheel 3 to the vehicle body frame F. The rear fender 62 is formed of the front-side rear fender 63 forming a front part and the rear-side rear fender 64 attached to a rear portion of the front-side rear fender 63. The rear-side rear fender 64 includes the outer fender 67 designed to be visually recognized as exterior when viewed from the rear of the vehicle, the inner fender 68 provided inside the outer fender 67, and the rear stay 211 made of metal and provided between the outer fender 67 and the inner fender 68. The rear stay 211 is detachably attached to the vehicle body frame F.

According to this configuration, the rear stay 211 is housed inside the rear-side rear fender 64. Thus, the strength for supporting the rear fender 62 can be increased with the rear stay 211. Moreover, since the rear stay 211 is not exposed to the outside, the exterior of the motorcycle 1 can be improved. Furthermore, since the rear-side rear fender 64 is freely attachable to and detachable from the vehicle body frame F, the rear-side rear fender 64 can be easily removed. Thus, the rear-side rear fender 64 can be easily replaced when broken. In addition, the motorcycle 1 can be easily customized by removing the rear-side rear fender 64 in accordance with the rider's preference.

As shown in FIGS. 15, 16A, and 16B, the front-side rear fender 63 is sandwiched between the rear stay 211 and the vehicle body frame F and is fastened to the vehicle body frame F side together with the rear stay 211. By this fastening, the front-side rear fender 63 and the rear stay 211 can be fixed firmly. Furthermore, it is possible to reduce the number of components and thus to reduce the cost, as compared to the case of separately attaching the front-side rear fender 63 and the rear stay 211 to the vehicle body frame F.

A rear portion of the front-side rear fender 63 and a front portion of the outer fender 67 are overlapped with each other on a lower portion of the vehicle body frame F, and the outer fender 67 is sandwiched between the rear stay 211 and the front-side rear fender 63 and fastened to the vehicle body frame F side together with the rear stay 211 and the front-side rear fender 63. By this fastening, the front-side rear fender 63, the outer fender 67, and the rear stay 211 can be fixed firmly. Furthermore, it is possible to reduce the number of components and thus to reduce the cost, as compared to the case of separately attaching the front-side rear fender 63, the outer fender 67, and the rear stay 211 to the vehicle body frame F.

As shown in FIGS. 3 to 5, 16A, and 16B, the vehicle body frame F includes the rearwardly projecting portions 201a being brackets extending toward the rear of the vehicle and the inwardly projecting pieces 202 being brackets extending toward the inside of the vehicle, and the rear stay 211 is attached to the rearwardly projecting portions 201a and the inwardly projecting pieces 202. Thus, with the inwardly projecting pieces 202 extending toward the inside of the vehicle and the rearwardly projecting portions 201a extending toward the rear of the vehicle, the rear stay 211 can be fastened more easily than the case of attaching the rear stay 211 directly to the vehicle body frame F. Accordingly, the assemblability can be improved.

As shown in FIGS. 7 and 15, the rear end of the inner fender 68 is located closer to the front of the vehicle than the rear end of the outer fender 67 is, and thus the inner fender 68 is not provided to extend to the rear end of the vehicle body. This prevents unnecessary weight increase and also offers compactness. Accordingly, a light, small, and slim motorcycle is possible.

As shown in FIG. 15, the rear stay 211 is a license-light stay. Thus, the strength for supporting the license light 206 can be increased. Accordingly, vibrations of the license light 206 can be suppressed.

As shown in FIGS. 2 to 5 and 15, the vehicle body frame F includes: the pair of left and right seat frames 17 and 17 supporting the seat 12; and the pair of left and right sub frames 18 and 18 extending upwardly rearward below the seat frames 17 and 17. The rear-side rear fender 64 is detachably attached to the rear end joining members 201 and 201 joining rear end portions of the seat frames 17 and 17 and the sub frames 18 and 18 to each other. Thus, the rear-side rear fender 64 can be supported by the rear end joining members 201 which have high rigidity and join the seat frames 17 and the sub frames 18 to each other. Accordingly, the rear-side rear fender 64 can be supported firmly, and thus vibrations of the rear-side rear fender 64 due to vibrations of the vehicle body can be suppressed.

The embodiment described above merely shows one mode of the present invention. Any modifications and applications are possible without departing from the spirit and scope of the present invention.

Further, the present invention is applicable not only to the motorcycle 1 but also to saddle-ride type vehicles other than the motorcycle.

EXPLANATION OF THE REFERENCE NUMERALS

1 MOTORCYCLE (SADDLE-RIDE TYPE VEHICLE)
3 REAR WHEEL
12 SEAT
17 SEAT FRAME
18 SUB FRAME
62 REAR FENDER
63 FRONT-SIDE REAR FENDER
64 REAR-SIDE REAR FENDER
67 OUTER FENDER
68 INNER FENDER
201 REAR END JOINING MEMBER (JOINING MEMBER)
201a REARWARDLY PROJECTING PORTION (BRACKET)
202 INWARDLY PROJECTING PIECE (BRACKET)
206 LICENSE LIGHT
211 REAR STAY (STAY)
F VEHICLE BODY FRAME

The invention claimed is:

1. A saddle-ride type vehicle, comprising:
a rear fender attached above a rear wheel to a vehicle body frame, the rear fender including a front-side rear fender forming a front part and a rear-side rear fender attached to a rear portion of the front-side rear fender,
wherein the rear-side rear fender also includes an outer fender designed to be visually recognized as exterior when viewed from a rear of the vehicle, an inner fender provided inside the outer fender, and a metal stay provided between the outer fender and the inner fender, wherein the stay is detachably attached to the vehicle body frame.

2. The saddle-ride type vehicle according to claim 1, wherein the front-side rear fender is sandwiched between the stay and the vehicle body frame and fastened to a vehicle body frame side together with the stay.

3. The saddle-ride type vehicle according to claim 1, wherein
a rear portion of the front-side rear fender and a front portion of the outer fender are overlapped with each other on a lower portion of the vehicle body frame, and
wherein the outer fender is sandwiched between the stay and the front-side rear fender and fastened to a vehicle body frame side together with the stay and the front-side rear fender.

4. The saddle-ride type vehicle according to claim 1, wherein
the vehicle body frame includes a first bracket extending toward the rear of the vehicle and a second bracket extending toward an inside of the vehicle, and wherein the stay is attached to the first and second brackets.

5. The saddle-ride type vehicle according to claim 1, wherein a rear end of the inner fender is located closer to a front of the vehicle than a rear end of the outer fender.

6. The saddle-ride type vehicle according to claim 1, wherein the stay comprises a license-light stay.

7. The saddle-ride type vehicle according to claim 1, wherein
the vehicle body frame includes a pair of left and right seat frames supporting a seat and a pair of left and right sub frames extending upwardly rearward below the seat frames, and wherein
the rear-side rear fender is detachably attached to a joining member joining rear end portions of the seat frames and the sub frames to each other.

8. A saddle-ride type vehicle, comprising:
front-side rear fender means forming a front part of a rear fender;
rear-side rear fender means for forming a rear-side of the rear fender, said rear-side fender means being attached to a rear portion of the front-side rear fender means,
wherein the rear-side rear fender means also includes outer fender means for being visually identified as an exterior surface when viewed from a rear of the vehicle, and inner fender means provided inside the outer fender, for forming an inner fender surface, and metal stay means provided between the outer fender means and the inner fender means, the metal stay means for supporting the rear-side rear fender means, and wherein the metal stay means is detachably attached to the vehicle body frame.

9. The saddle-ride type vehicle according to claim 8, wherein the front-side rear fender means is sandwiched between the stay means and the vehicle body frame, and fastened to a vehicle body-frame-side together with the stay means.

10. The saddle-ride type vehicle according to claim 8, wherein a rear portion of the front-side rear fender means and a front portion of the outer fender means are overlapped with each other on a lower portion of the vehicle body frame, and wherein the outer fender means is sandwiched between the stay means and the front-side rear fender means, and fastened to a vehicle body frame-side together with the stay means and the front-side rear fender means.

11. The saddle-ride type vehicle according to claim 8, wherein the vehicle body frame includes a first bracket means extending toward the rear of the vehicle and a second bracket means extending toward an inside of the vehicle, and wherein the stay means is attached to the first and second bracket means.

12. The saddle-ride type vehicle according to claim 8, wherein a rear end of the inner fender means is disposed closer to a front of the vehicle than a rear end of the outer fender means.

13. The saddle-ride type vehicle according to claim 8, wherein the stay means comprises a license-light stay means.

14. The saddle-ride type vehicle according to claim 8, wherein the vehicle body frame includes left and right seat frame means for supporting a seat thereupon, and left and right sub-frame means extending upwardly rearward below the seat frame means, and wherein the rear-side rear fender means is detachably attached to a joining means for joining rear end portions of the seat frame means and the sub frame means to each other.

* * * * *